United States Patent
Suzuki et al.

(10) Patent No.: US 12,093,033 B2
(45) Date of Patent: Sep. 17, 2024

(54) VEHICLE REMOTE CONTROL METHOD AND VEHICLE REMOTE CONTROL DEVICE

(71) Applicant: Nissan Motor Co., Ltd., Yokohama (JP)

(72) Inventors: Yasuhiro Suzuki, Kanagawa (JP); Junya Kobayashi, Kanagawa (JP); Ryota Yamanaka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 395 days.

(21) Appl. No.: 17/640,990

(22) PCT Filed: Sep. 9, 2019

(86) PCT No.: PCT/IB2019/001097
§ 371 (c)(1),
(2) Date: Mar. 7, 2022

(87) PCT Pub. No.: WO2021/048582
PCT Pub. Date: Mar. 18, 2021

(65) Prior Publication Data
US 2022/0342415 A1    Oct. 27, 2022

(51) Int. Cl.
*G05D 1/00*  (2024.01)
*B60W 30/06*  (2006.01)
(Continued)

(52) U.S. Cl.
CPC .......... *G05D 1/0016* (2013.01); *B60W 30/06* (2013.01); *B60W 40/08* (2013.01);
(Continued)

(58) Field of Classification Search
CPC .... G05D 1/0016; B60W 30/06; B60W 40/08; B60W 60/001; G06F 3/0484; G06F 3/04883; G08C 17/02
See application file for complete search history.

(56) References Cited

U.S. PATENT DOCUMENTS

| | | | |
|---|---|---|---|
| 2013/0002578 A1 | 1/2013 | Ito et al. | |
| 2013/0321301 A1 | 12/2013 | Takeichi | |

(Continued)

FOREIGN PATENT DOCUMENTS

| | | |
|---|---|---|
| JP | 2013-012021 A | 1/2013 |
| JP | 2014-006883 A | 1/2014 |
| WO | 2019/163165 A1 | 8/2019 |

OTHER PUBLICATIONS

U. E. Manawadu, M. Kamezaki, M. Ishikawa, T. Kawano and S. Sugano, "A hand gesture based driver-vehicle interface to control lateral and longitudinal motions of an autonomous vehicle," 2016 IEEE International Conference (Year: 2016).*

*Primary Examiner* — Russell Frejd
*Assistant Examiner* — Brittany Renee Peko
(74) *Attorney, Agent, or Firm* — Young Basile Hanlon & MacFarlane, P.C.

(57) ABSTRACT

A vehicle remote control method controls a vehicle having an autonomous travel control function to execute autonomous travel control. The method includes detecting an input position at which a touch operation is performed by an operator on a touch panel of a remote operation device and making a gesture determination area variable in accordance with the input position. The gesture determination area is an area in which a gesture for remotely controlling the vehicle is received. The method further includes detecting the gesture from the gesture determination area and determining whether or not the detected gesture is a command gesture that is preliminarily set. When the gesture is the command (Continued)

gesture, the vehicle is controlled to execute the autonomous travel control.

27 Claims, 19 Drawing Sheets

(51) Int. Cl.
*B60W 40/08* (2012.01)
*B60W 60/00* (2020.01)
*G06F 3/0484* (2022.01)
*G06F 3/04883* (2022.01)

(52) U.S. Cl.
CPC ......... *B60W 60/001* (2020.02); *G06F 3/0484* (2013.01); *G06F 3/04883* (2013.01)

(56) References Cited

U.S. PATENT DOCUMENTS

| | | | |
|---|---|---|---|
| 2015/0375741 A1* | 12/2015 | Kiriya | B60W 30/06 |
| 2016/0170494 A1 | 6/2016 | Bonnet et al. | |
| 2017/0120930 A1* | 5/2017 | Ling | B60W 50/10 |
| 2019/0111917 A1* | 4/2019 | Kim | B60W 30/06 |
| 2019/0163186 A1* | 5/2019 | Yoon | G05D 1/0088 |
| 2022/0244789 A1* | 8/2022 | Kulbat | G06F 3/017 |

* cited by examiner

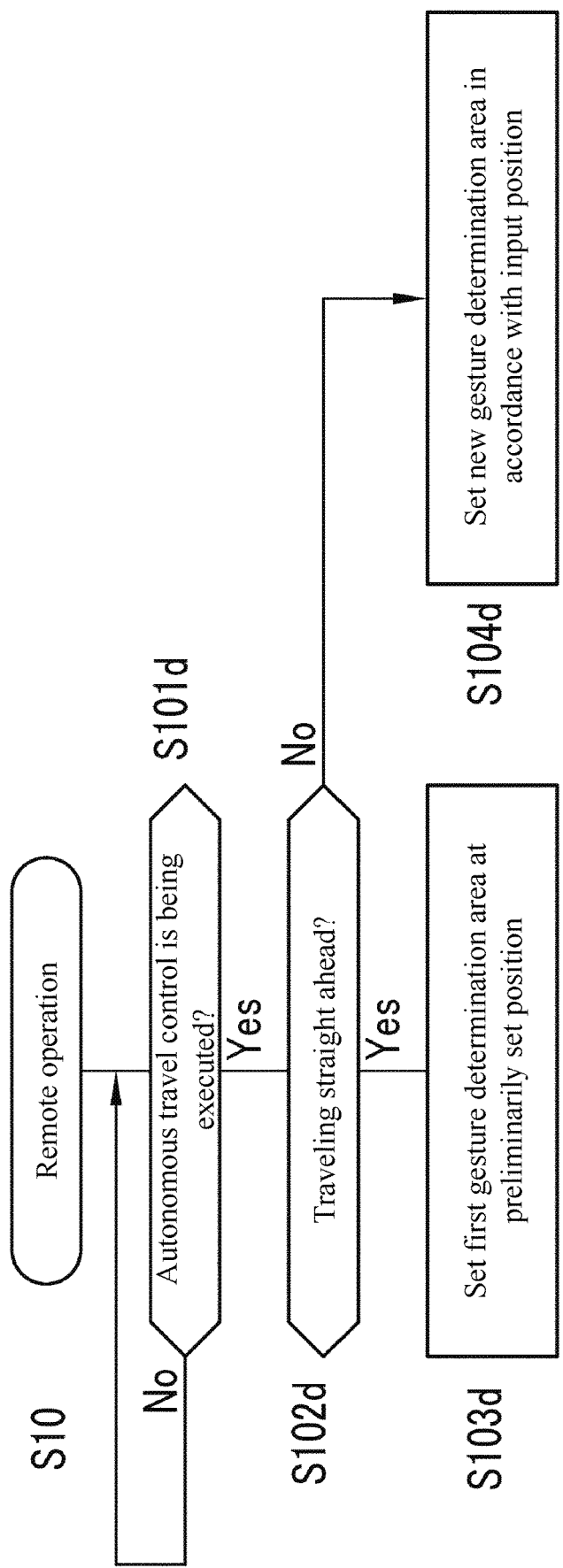

VEHICLE REMOTE CONTROL METHOD AND VEHICLE REMOTE CONTROL DEVICE

TECHNICAL FIELD

The present invention relates to a vehicle remote control method and a vehicle remote control device that allow a vehicle having an autonomous travel control function to autonomously travel by remote operation.

BACKGROUND

A method for remote control of a vehicle is known (US2016/0170494A). In this method, a gesture is input to the touch panel of a remote operation device for the vehicle. When the input gesture corresponds to a predefined gesture, the vehicle is allowed to execute a predetermined function allocated to the gesture.

SUMMARY

In the above prior art, the input position of the gesture with respect to the touch panel is preliminarily specified. Therefore, if the input position of the gesture deviates from the preliminarily specified input position, the gesture is not determined as a regular gesture, and the vehicle cannot execute a predetermined function.

A problem to be solved by the present invention is to provide a remote control method and a remote control device for a vehicle with which a gesture can be input at an arbitrary position on a touch panel.

The present invention solves the above problem through detecting an input position of a touch operation on a touch panel of a remote operation device and making a gesture determination area variable in accordance with the input position. The gesture determination area is an area in which a gesture is received.

According to the present invention, the gesture can be input at an arbitrary position on the touch panel, and the vehicle can therefore execute a predetermined function regardless of the input position of the gesture.

BRIEF DESCRIPTION OF THE DRAWINGS

FIG. 16 is a flowchart illustrating a procedure of the remote operation of a fifth embodiment.

DETAILED DESCRIPTION

First Embodiment

Figure 1:
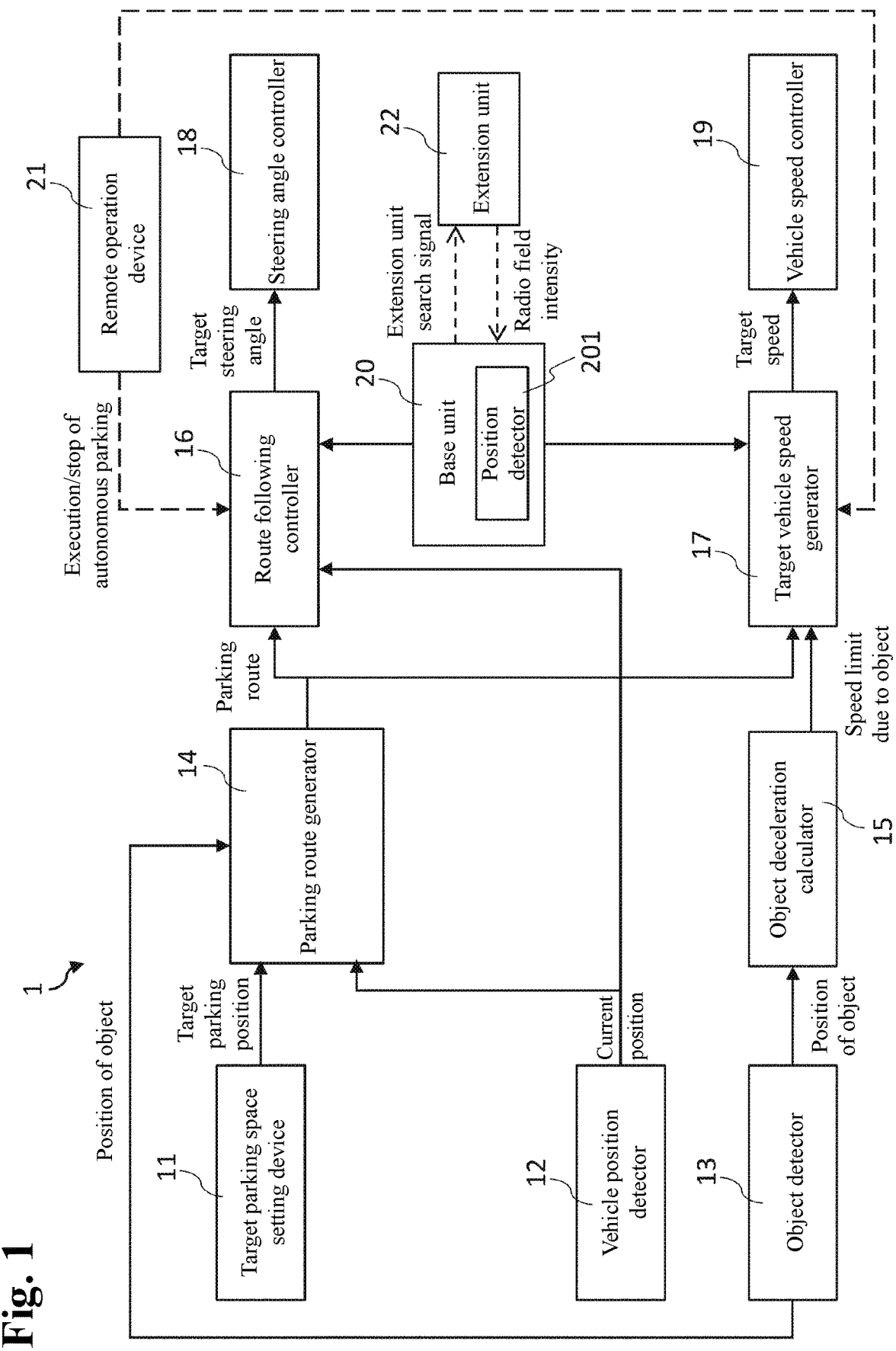
FIG. 1 is a block diagram illustrating a remote parking system to which the vehicle remote control method and vehicle remote control device of the present invention are applied.

Hereinafter, an embodiment of the present invention will be described with reference to the drawings. FIG. 1 is a block diagram illustrating a remote parking system 1 to which the remote control method and remote control device for a vehicle of the present invention are applied. In the present specification, "autonomous travel control" refers to controlling a vehicle to travel through automated or autonomous control executed by an onboard travel control device without relying on a driver's driving operation, while "autonomous parking control," which is one type of the autonomous travel control, refers to controlling a vehicle to park (enter or exit a parking space or a garage) through automated or autonomous control executed by an onboard travel control device without relying on a driver's driving operation. Also in the present specification, "parking" refers to a vehicle being continuously stopped in a parking space, and the term "travel route" encompasses not only a parking route in the case of entry into a parking space or a garage but also a route for exit from a parking space or a garage. In this sense, the "vehicle travel control method and vehicle travel control device used when parking" encompass both the travel control of a vehicle at the time of entry into a parking space or a garage and the travel control of a vehicle at the time of exit from a parking space or a garage. The entry into a parking space or a garage may be simply referred to as entry or entering, and the exit from a parking space or a garage may be simply referred to as exit or exiting. In the following embodiments, specific examples of the present invention will be described with reference to an example in which the remote control method and remote control device according to the present invention are applied to a remote parking system in which a remote-controlled vehicle is parked by autonomous travel control. The remote parking system 1 of the present embodiment performs the autonomous travel control in an assist mode in which an operator such as a driver gets on a vehicle and an intervention operation performed by the operator is possible. After that, the operator gets off the vehicle and performs the autonomous travel control from outside the vehicle in a remote control mode using a remote operation device.

The remote parking system 1 according to the present embodiment is a system for performing the operation of entry into or exit from a parking space or a garage by the autonomous travel control when performing the operation. More specifically, the driver gets off the vehicle in mid-course of the entry into a parking space or a garage and continues to transmit an execution command signal from a remote operation device while confirming safety, and the vehicle thereby continues the autonomous parking control. When the vehicle may collide with an obstacle, the autonomous parking control is stopped by pausing transmission of the execution command signal from the remote operation device. In the following description, the autonomous travel control mode in which an operator such as a driver gets on the vehicle and can perform the intervention operation will be referred to as an assist mode, and the autonomous travel control mode in which the operator gets off the vehicle and performs the operation of entry into or exit from a parking space or a garage with the use of remote operation will be referred to as a remote control mode.

In a narrow parking space in which side doors cannot be fully opened, such as a narrow garage or a parking lot in which other vehicles are parked on both sides, for example, it may be difficult for the driver to get on or get off the vehicle. To enable the parking even in such a case, the remote control mode can be used together with the remote operation. When performing the entry into a parking space in the remote control mode, after the remote control mode is initiated to calculate the entry route into the selected parking space and start the autonomous parking control, the driver gets off the vehicle while carrying the remote operation device. The driver who has got off the vehicle continues to transmit the execution command signal from the remote operation device to the vehicle to complete the entry into the selected parking space. On the other hand, when performing the exit from the parking space, the driver turns on the internal combustion engine or drive motor of the vehicle using the remote operation device carried by the driver, and after the remote exit mode is initiated to calculate the exit route to a selected exit position and start the autonomous exit control, the driver continues to transmit the execution command from the remote operation device to complete the exit from the parking space and then gets on the vehicle. Thus, the remote parking system 1 of the present embodiment is a system having such a remote control mode with the use of the remote operation. An example of the autonomous parking control will be exemplified as autonomous reverse parking control illustrated in FIG. 2, but the present invention can also be applied to the exit from a parking space or a garage, autonomous parallel parking, and other autonomous parking.

The remote parking system 1 of the present embodiment includes a target parking space setting device 11, a vehicle position detector 12, an object detector 13, a parking route generator 14, an object deceleration calculator 15, a route following controller 16, a target vehicle speed generator 17, a steering angle controller 18, a vehicle speed controller 19, a base unit 20, a remote operation device 21, and an extension unit 22. The target parking space setting device 11, vehicle position detector 12, object detector 13, parking route generator 14, object deceleration calculator 15, route following controller 16, target vehicle speed generator 17, steering angle controller 18, vehicle speed controller 19, and base unit 20 are equipped in the vehicle. The remote operation device 21 and extension unit 22 are carried by an operator such as a driver. Each configuration will be described below.

In the remote control mode, the target parking space setting device 11 searches for parking spaces existing around the subject vehicle and allows the operator to select a desired parking space from among available parking spaces. In addition, the target parking space setting device 11 outputs positional information of the selected parking space (such as the coordinates of a relative position from the current position of the subject vehicle and the latitude/longitude) to the parking route generator 14.

To achieve the above-described functions, the target parking space setting device 11 includes an input switch, a plurality of cameras, a parking space detector, and a touch panel-type display (none of which are illustrated). The input switch selectively selects the remote control mode or the assist mode. The plurality of cameras captures images around the vehicle. The cameras of the target parking space setting device 11 may also be used as one or more cameras of the object detector 13, which will be described later. The parking space detector is a computer that is installed with a software program for searching for available parking spaces from the image data captured by the cameras. The touch panel-type display is used for display of the detected parking spaces and selection of a parking space.

When an operator such as a driver selects the remote control mode using the input switch, the target parking space setting device 11 uses the plurality of cameras to acquire the image data around the subject vehicle and analyzes the image data to detect available parking spaces. In addition, the target parking space setting device 11 displays an image including the available parking spaces on the touch panel-type display and prompts the operator to select a parking space in which the operator wants to park the vehicle. When the operator selects a desired parking space from among the displayed parking spaces, the target parking space setting device 11 outputs the positional information of that parking space to the parking route generator 14. Upon search for the available parking spaces, when the map information stored in a navigation device includes parking lot information having detailed positional information, the parking lot information may be used.

The vehicle position detector 12 is composed of a GPS unit, a gyro sensor, a vehicle speed sensor, and other components. The GPS unit detects radio waves transmitted from a plurality of satellite communications and periodically acquires positional information of the subject vehicle. The vehicle position detector 12 detects the current position of the subject vehicle based on the positional information of the subject vehicle acquired by the GPS unit, the angle change information acquired from the gyro sensor, and the vehicle speed acquired from the vehicle speed sensor. The positional information of the subject vehicle detected by the vehicle position detector 12 is output to the parking route generator 14 and the route following controller 16 at predetermined time intervals.

The object detector 13 is configured to search for whether or not an object such as an obstacle is present around the subject vehicle. The object detector 13 includes one or more cameras, radar (such as millimeter-wave radar, laser radar, or ultrasonic radar), sonar, or the like or a combination thereof. The cameras, radar, sonar, or the like or a combination thereof is attached to an outer panel part of the subject vehicle. The position to which the object detector 13 is attached is not particularly limited. One or more object detectors 13 can be attached, for example, to all or part of sites of the center and both sides of the front bumper, the center and both sides of the rear bumper, the sill outers below the right and left center pillars, and the like.

Each object detector 13 further includes a computer that is installed with a software program for specifying the position of an object detected by the cameras, radar, or the like. This computer outputs the specified object information (target object information) and its positional information (such as the coordinates of a relative position from the current position of the subject vehicle and the latitude/longitude) to the parking route generator 14 and the object deceleration calculator 15. Before the start of the autonomous parking control, the specified object information and its positional information are used by the parking route generator 14 to generate a parking route. When an object such as an abrupt obstacle is detected during the autonomous parking control, the object deceleration calculator 15 uses the object information and its positional information for control of decelerating or stopping the subject vehicle.

The parking route generator 14 calculates a parking route from the current position of the subject vehicle to the target parking position (the parking route refers to the entry route in the case of the remote control mode, here and hereinafter). The parking route is calculated so as not to collide or interfere with an object. Calculation of the parking route includes using the size of the subject vehicle (such as a vehicle width, a vehicle length, or a minimum turning radius) which is preliminarily stored, the target parking position (which refers to the positional information of the parking space in the case of the remote control mode, here and hereinafter) from the target parking space setting device 11, the current positional information of the subject vehicle from the vehicle position detector 12, and the positional information of an object (obstacle) from the object detector 13.

Figure 2:
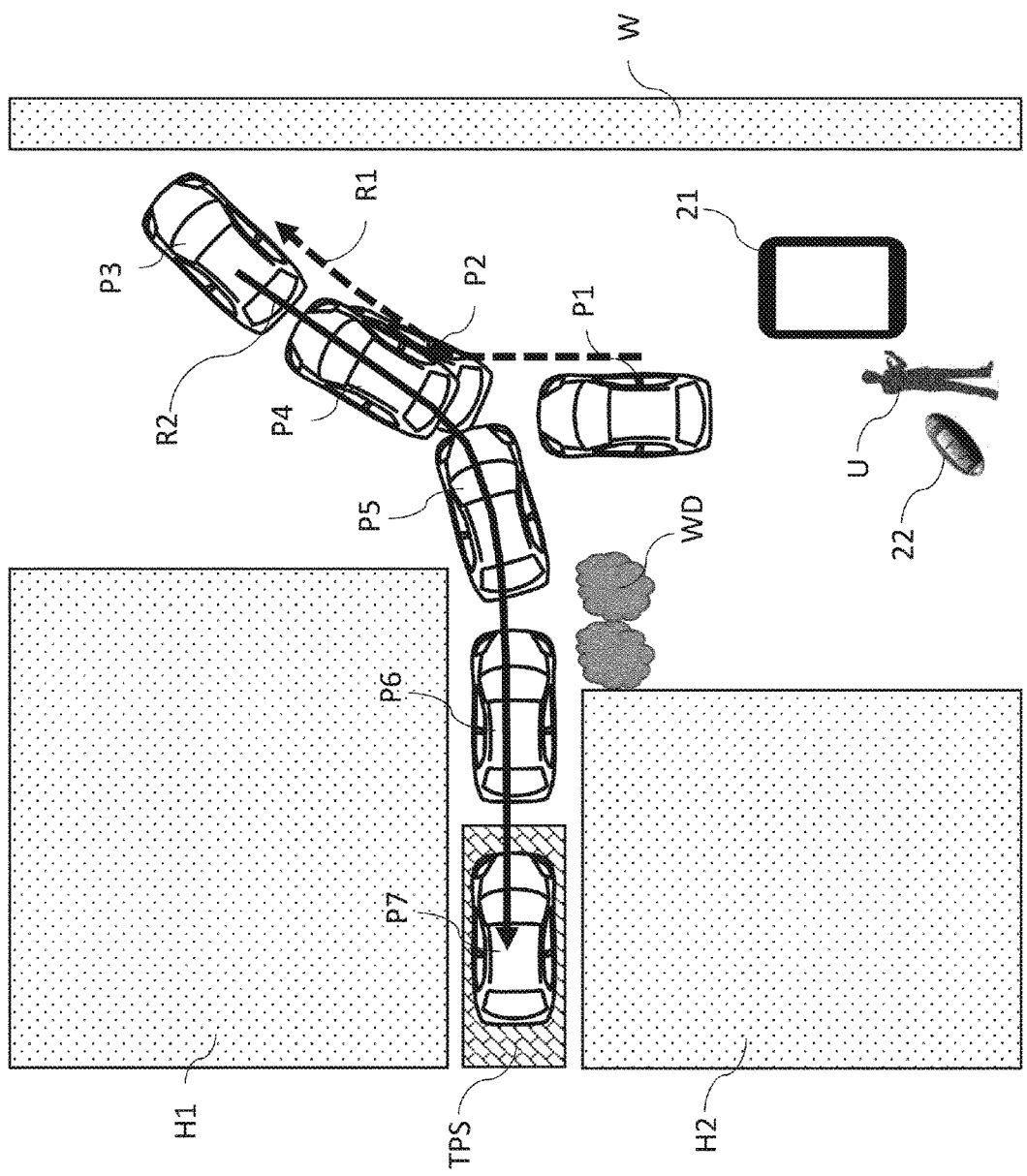
FIG. 2 is a plan view illustrating an example of remote reverse parking executed in the remote parking system of FIG. 1.

FIG. 2 is a plan view illustrating an example of the remote control mode. At a current position P1 of a subject vehicle V illustrated in FIG. 2, when an operator U such as the driver operates the input switch inside the vehicle to select the remote control mode, the target parking space setting device 11 searches for available parking spaces TPSs and displays an image including the parking spaces TPSs on a display. In response to this, when the operator U selects a parking space TPS, the parking route generator 14 calculates a parking route R1 from the current position P1 to a position of turn for parking P3 and a parking route R2 from the position of turn for parking P3 to the parking space TPS which is the target. Then, the parking route generator 14 outputs this series of the parking routes R1 and R2 to the route following controller 16 and the target vehicle speed generator 17.

The object deceleration calculator 15 receives the positional information of obstacles and other objects from the object detector 13 and calculates the time for the subject vehicle to collide with an object (TTC: Time to Collision) based on the distance from the object and the vehicle speed, thus calculating the deceleration start timing of the subject vehicle. For example, in the remote control mode illustrated in FIG. 2, objects as obstacles include a wall W on the right side of the road at the position of turn for parking P3, houses H1 and H2 on both the right and left sides of the parking route R2 to the target parking space TPS, and garden trees WD. When determining that the distance from such an obstacle is a predetermined value or more, the object deceleration calculator 15 sets the vehicle speed to an initial set value and decelerates the vehicle speed of the subject vehicle V at the timing when the time TTC for the subject vehicle V to collide with the obstacle becomes a predetermined value or less. Likewise, when an abrupt obstacle is detected on the parking route R1 or R2 during execution of the sequential autonomous parking control illustrated in FIG. 2, the subject vehicle V is decelerated or stopped at the timing when the time TTC for the subject vehicle V to collide with the obstacle becomes a predetermined value or less. This deceleration start timing is output to the target vehicle speed generator 17.

The route following controller 16 calculates, at predetermined time intervals, a target steering angle for the subject vehicle to follow the parking routes based on the parking routes from the parking route generator 14 and the current position of the subject vehicle from the vehicle position detector 12. As for the parking routes R1 and R2 of FIG. 2, the route following controller 16 calculates, at a predetermined time interval for each current position of the subject vehicle V, the target steering angle along the parking route R1 for traveling straight ahead and turning right from the current position P1 to the position of turn for parking P3. Likewise, the route following controller 16 calculates, at a predetermined time interval for each current position of the subject vehicle V, the target steering angle along the parking route R2 for turning left and traveling straight ahead from the position of turn for parking P3 to the parking space TPS. The route following controller 16 outputs the calculated target steering angles to the steering angle controller 18.

The target vehicle speed generator 17 calculates, at predetermined time intervals, a target vehicle speed for the subject vehicle V to follow the parking routes based on the parking routes from the parking route generator 14 and the deceleration start timing from the object deceleration calculator 15. As for the entry routes R1 and R2 of FIG. 2, the target vehicle speed generator 17 calculates, at a predetermined time interval for each current position of the subject vehicle V, the target vehicle speed when starting from the current position P1, traveling straight ahead and turning right, and stopping at the position of turn for parking P3 and outputs the calculated target vehicle speed to the vehicle speed controller 19. Likewise, the target vehicle speed generator 17 calculates, at a predetermined time interval for each current position of the subject vehicle V, the target vehicle speed when starting again (moving backward) from the position of turn for parking P3 and turning left on the way to the target paring space TPS and the target vehicle speed when approaching the target parking space TPS and stopping there and outputs the calculated target vehicle speeds to the vehicle speed controller 19. When an abrupt obstacle is detected on the parking route R1 or R2 during execution of the sequential autonomous parking control illustrated in FIG. 2, the timing of deceleration or stopping is output from the object deceleration calculator 15, and the target vehicle speed generator 17 therefore outputs the target vehicle speed to the vehicle speed controller 19 in accordance with that timing.

The steering angle controller 18 generates a control signal for operating a steering actuator provided in the steering system of the subject vehicle V based on the target steering angle from the route following controller 16. The vehicle speed controller 19 also generates a control signal for operating an accelerator actuator provided in the drive system of the subject vehicle V based on the target vehicle speed from the target vehicle speed generator 17. The steering angle controller 18 and the vehicle speed controller 19 are concurrently controlled thereby to execute the autonomous parking control.

The extension unit 22 and the base unit 20 will then be described. The international standard for autonomous travel control of a vehicle defines a condition for permitting the remote operation of a vehicle, in which the distance between the vehicle and the operator is within a predetermined remote operation distance (e.g., within 6 m). In the remote parking system 1 of the present embodiment, therefore, the extension unit 22 carried by the operator U and the base unit 20 equipped in the subject vehicle V are used to detect the relative position of the extension unit 22 with respect to the subject vehicle V, that is, the relative position of the operator U, who carries the extension unit 22, with respect to the subject vehicle V. The extension unit 22 and the base unit 20 constitute a so-called keyless entry system. The keyless entry system is a system configured such that when the operator U such as the driver approaches the subject vehicle V within a predetermined distance in a state of carrying the extension unit 22, wireless communication is established between the base unit 20 equipped in the subject vehicle V and the extension unit 22 to perform automated unlocking of the door lock or the like.

Figure 3:
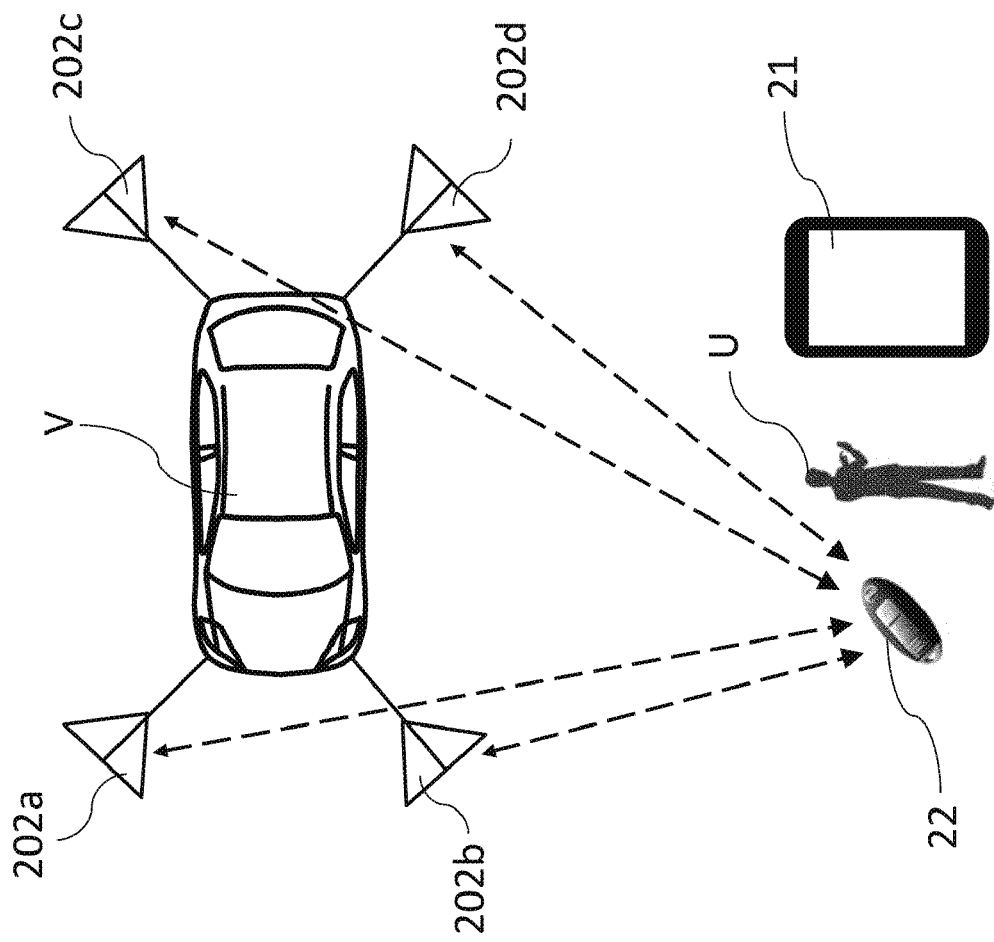
FIG. 3 is an explanatory diagram illustrating a state of detecting the relative position of an extension unit of FIG. 1 with respect to a subject vehicle.

In the present embodiment, as illustrated in FIG. 3, for example, antennas 202*a* to 202*d* connected to the base unit 20 are installed at predetermined sites of the subject vehicle V. The base unit 20 transmits extension unit search signals from the antennas 202*a* to 202*d*. When approaching the subject vehicle V within a predetermined distance, the extension unit 22 receives the extension unit search signals transmitted from the antennas 202*a* to 202*d* and measures the radio field intensity of the extension unit search signal from each of the antennas 202*a* to 202*d*. The radio field intensity of the extension unit search signal varies depending on the distance between the extension unit 22 and each of the antennas 202*a* to 202*d*. That is, when the extension unit 22 is present near the antenna 202*b* in the vicinity of the left side of the front bumper, the radio field intensity of the extension unit search signal received from the antenna 202*b* is the strongest, while the radio field intensity of the extension unit search signal received from the antenna 202*c* in the vicinity of the right side of the rear bumper is the weakest.

The extension unit 22 transmits the measured radio field intensity of the extension unit search signal from each of the antennas 202*a* to 202*d* to the base unit 20. The base unit 20 has a position detector 201 that is, for example, a computer installed with a software program for calculating the position of the extension unit 22 from the radio field intensities of the antennas 202*a* to 202*d* received from the extension unit 22, such as by using a triangulation method. On the basis of the radio field intensities of the antennas 202*a* to 202*d* received from the extension unit 22, the position detector 201 detects the relative position of the extension unit 22 with respect to the subject vehicle V, that is, the relative position of the operator U, who carries the extension unit 22, with respect to the subject vehicle V. The position detector 201 outputs the detected relative position of the extension unit 22 to the route following controller 16 and the target vehicle speed generator 17 (these may alternatively be the steering angle controller 18 and the vehicle speed controller 19) and transmits the detected relative position of the extension unit 22 to the remote operation device 21.

The remote operation device 21 is a device for the operator U to command from outside the vehicle as to whether to continue or stop the execution of the autonomous parking control which is set by the target parking space setting device 11. The remote operation device 21 therefore has a wireless communication function for transmitting the execution command signal to the route following controller 16 and the target vehicle speed generator 17 (these may alternatively be the steering angle controller 18 and the vehicle speed controller 19) and performs communication with a wireless communication function of the subject vehicle V.

The remote operation device 21 is provided, for example, as a mobile information terminal such as a smartphone installed with application software for remote control (referred to as an application, hereinafter). The smartphone installed with the application serves as the remote operation device 21 of the remote parking system 1 by activating the application.

The international standard for autonomous travel control of a vehicle defines that the vehicle is allowed to execute the autonomous travel control only while the operator continuously operates the remote operation device. In the remote parking system 1 of the present embodiment, therefore, the execution command signal is continued to be transmitted from the remote operation device 21 to the subject vehicle V only while a predetermined command gesture is continuously input to a touch panel 211 of the remote operation device 21. The subject vehicle V executes the autonomous parking control only while receiving the execution command signal transmitted from the remote operation device 21. That is, when the input of the command gesture to the remote operation device 21 is stopped, the execution command signal becomes not transmitted from the remote operation device 21 to the vehicle, and the execution of the autonomous parking control of the vehicle is suspended or stopped. To control the vehicle parked in a narrow parking space to exit the parking space by the remote operation from outside the vehicle, the remote operation device 21 further has a function of activating the drive source such as an engine or a motor of the vehicle by the remote operation.

Figure 4:
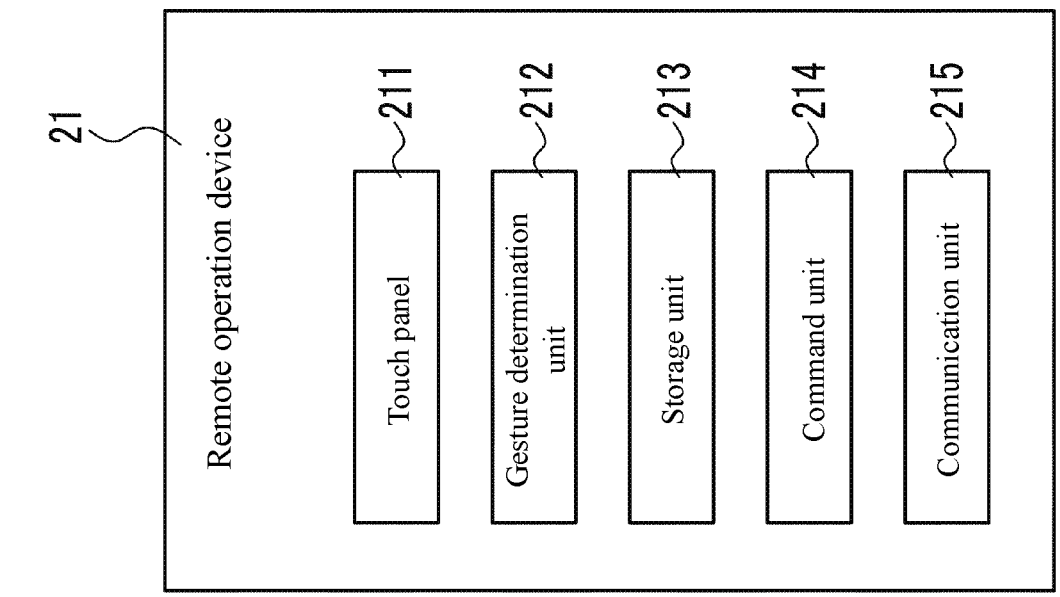
FIG. 4 is a block diagram illustrating the configuration of a remote operation device of FIG. 1.

As illustrated in FIG. 4, the remote operation device 21 includes a touch panel 211, a gesture determination unit 212, a storage unit 213, a command unit 214, and a communication unit 215. The touch panel 211 detects the touch operation performed by the operator U. The gesture determination unit 212 sets a gesture determination area on the touch panel 211. The gesture determination area is an area in which the input of a gesture is received. In addition, the gesture determination unit 212 detects a gesture from the gesture determination area and determines whether or not the detected gesture is a preliminarily set command gesture and whether or not the input speed of the gesture is within a predetermined range. The storage unit 213 stores various information items related to the determination of gesture made by the gesture determination unit 212. When a determination is made that the detected gesture is a command gesture and the input speed of the gesture is within a predetermined range, the command unit 214 generates the execution command signal for the subject vehicle V to execute the autonomous parking control using the autonomous travel control function. The communication unit 215 transmits the execution command signal generated in the command unit 214 to the subject vehicle V.

Figure 5A:
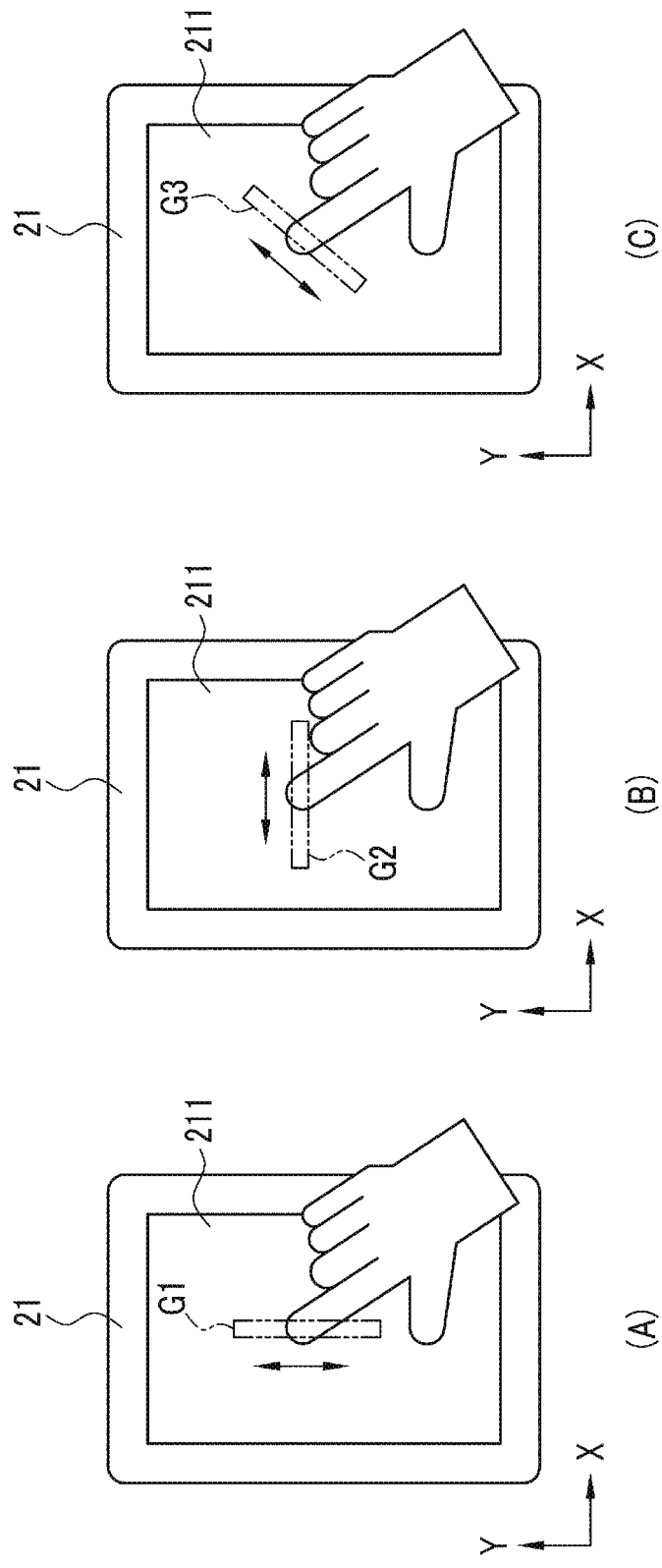
FIG. 5A is a set of explanatory diagrams each illustrating an example of a command gesture that is input to the remote operation device of FIG. 4.

Each part of the remote operation device 21 will be described below. The touch panel display of a smartphone that serves as the remote operation device 21 is used as the touch panel 211. The gesture which is input in the remote control mode is a specified command gesture that is preliminarily determined. The form and size of the specified command gesture are stored in the storage unit 213 of the remote operation device 21 in association with the application. When the lateral direction and longitudinal direction of the touch panel 211 are respectively defied as an X axis and a Y axis, for example, the command gesture refers to a touch operation in which the coordinates of the input position by the touch operation vary continuously in at least one of the X axis and the Y axis. In the examples illustrated in FIGS. 5A (A), (B), and (C), the command gesture may be a gesture G1 for sliding the finger in the longitudinal direction on the touch panel 211, a gesture G2 for sliding the finger in the lateral direction on the touch panel 211, or a gesture G3 for sliding the finger in a diagonal direction on the touch panel 211.

Figure 5B:
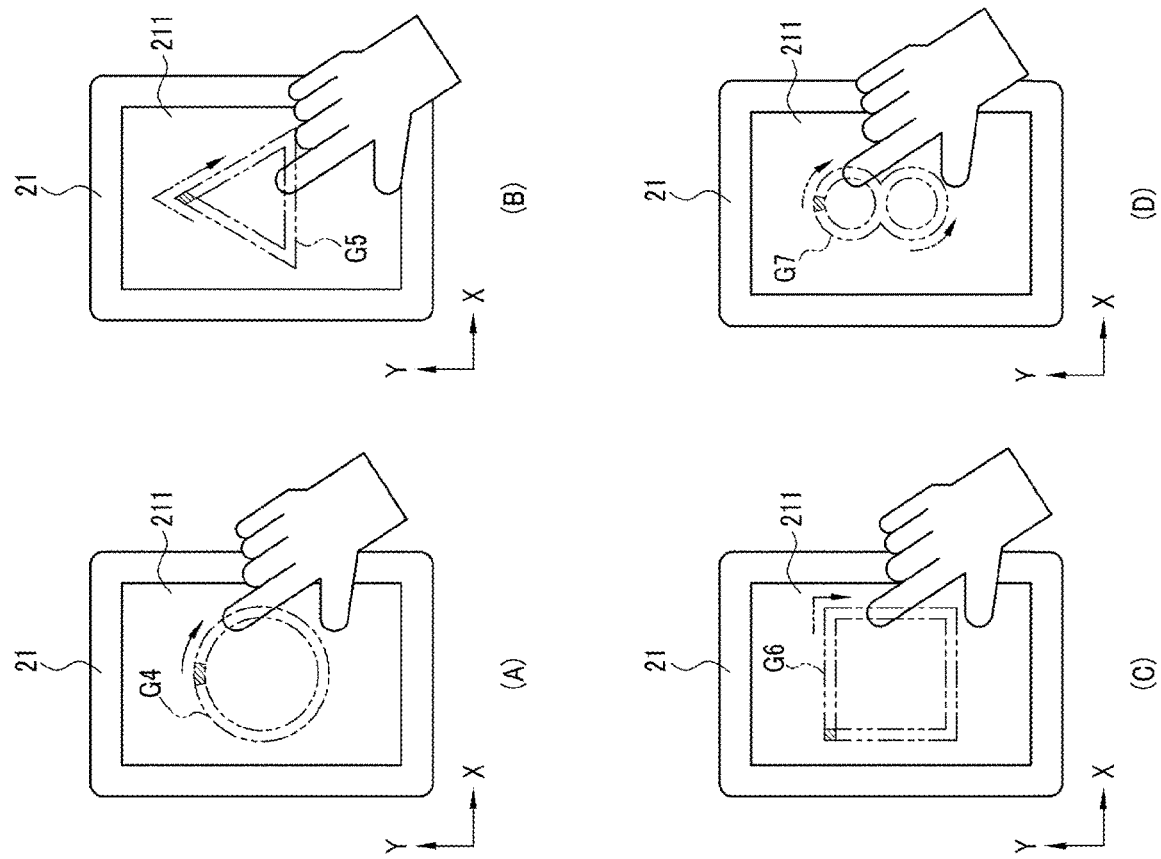
FIG. 5B is a set of explanatory diagrams each illustrating another example of a command gesture that is input to the remote operation device of FIG. 4.

A monotonous gesture of sliding the finger linearly may be erroneously determined as an input operation other than the command gesture. Moreover, when some object touches the touch panel 211 and moves, it may be determined as the command gesture. To prevent such erroneous determination of the command gesture, the command gesture may be defined, for example, as a touch operation of drawing the trajectory of a closed figure on the touch panel so that a starting end at which one input of the gesture is started and a terminating end at which the one input of the gesture is terminated overlap each other. Such a closed figure may be obtained by using a gesture G4 for drawing a circular-shaped figure as illustrated in FIG. 5B (A) or using a gesture G5 or G6 for drawing a triangle or a quadrangle as illustrated in FIG. 5B (B) or (C) or other polygon. Additionally or alternatively, as illustrated in FIG. 5B (D), a gesture G7 for drawing a figure such as a figure of eight or the like may be used. In FIG. 5B, the hatched portion indicates the starting end and terminating end of the gesture as an example. In the present embodiment, the gesture G4 for drawing a circular-shaped figure illustrated in FIG. 5B (A) is used as the specified command gesture.

As the central processing unit (CPU) of a smartphone that serves as the remote operation device 21 operates in accordance with the application, the gesture determination unit 212 functions. The gesture determination unit 212 sets the gesture determination area in response to the input position of the touch operation performed by the operator U on the touch panel 211. In addition, the gesture determination unit 212 makes the size of the gesture determination area with respect to the touch panel 211 variable. That is, the position and size of the gesture determination area which is set on the touch panel 211 are variable in accordance with the input position of the touch operation, and the specified command gesture can therefore be input with an arbitrary size at an arbitrary position on the touch panel 211. Through this operation, it is possible to prevent the autonomous parking control of the subject vehicle V from being stopped due to an input error of the command gesture, as compared with the prior art in which the input position and input size of a gesture are fixed at all times.

Figure 6A:
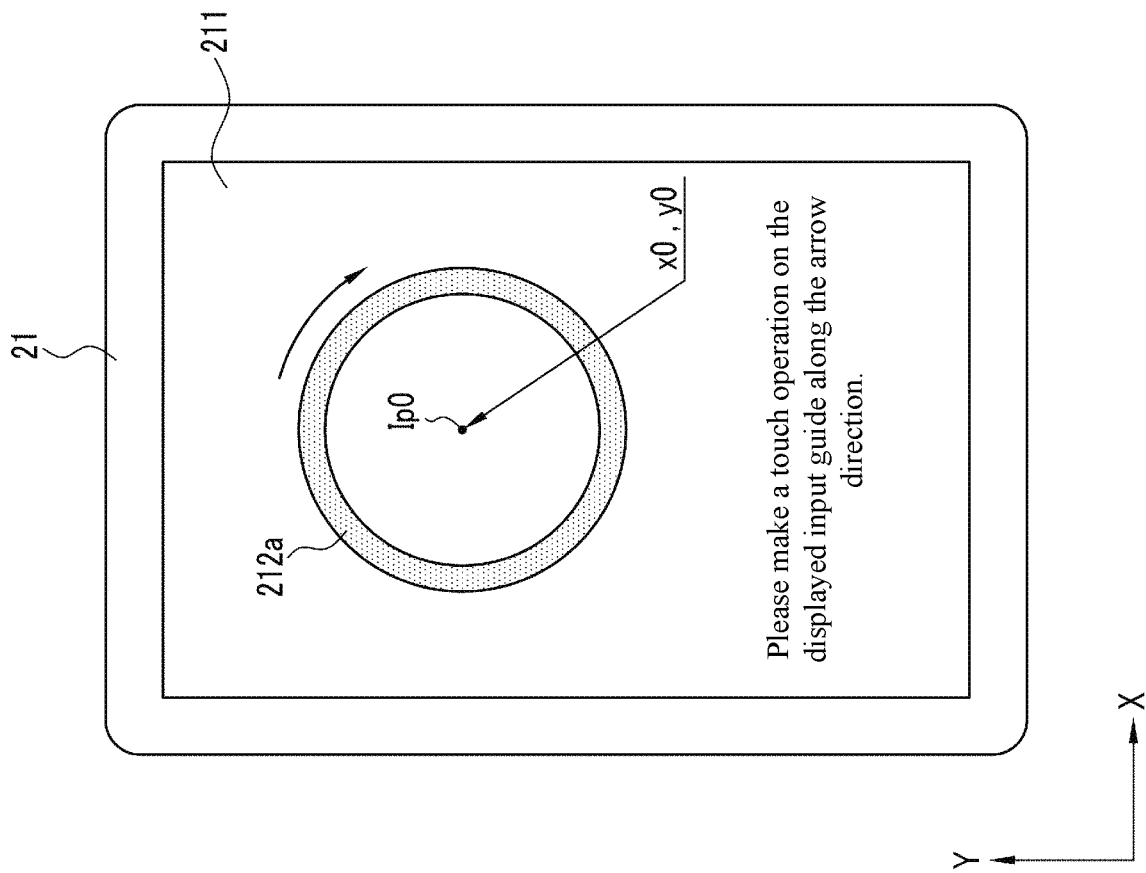
FIG. 6A is an explanatory diagram illustrating a state in which an input guide for a gesture is displayed on a touch panel of FIG. 4.

When starting the input of a gesture, as illustrated in FIG. 6A, the gesture determination unit 212 refers to a preliminarily set position on the touch panel 211, for example, the center position Ip0 (coordinates x0, y0), to display an input guide 212a indicating the shape of the command gesture G4 having a specified size. In the vicinity of the input guide 212a, a message such as "Please make a touch operation on the displayed input guide along the arrow direction" is displayed.

Figure 6B:
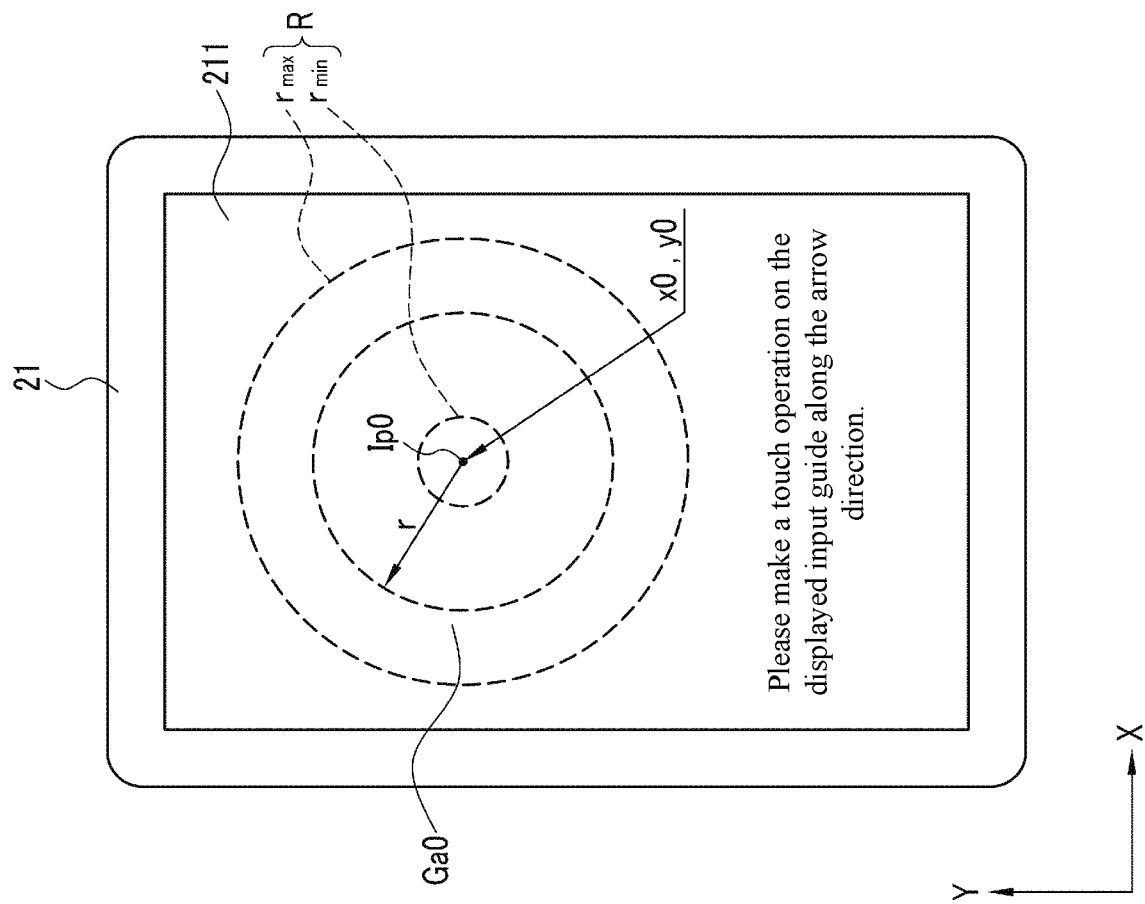
FIG. 6B is an explanatory diagram illustrating a first gesture determination area that is set on the remote operation device of FIG. 4.

When starting the input of a gesture, the gesture determination unit 212 sets a first gesture determination area Ga0 at a preliminarily set position on the touch panel 211 regardless of the input position of the touch operation with respect to the touch panel 211. Specifically, as illustrated in FIG. 6B, the gesture determination unit 212 sets the first gesture determination area Ga0 corresponding to the input guide 212a with reference to the center position Ip0 of the input guide 212a. When the width direction and longitudinal direction of the touch panel 211 are the X axis and the Y axis, respectively, the first gesture determination area Ga0 is defined by the center coordinates (x0, y0) of the predetermined center position Ip0 and the radius R. The radius R has a range defined by a minimum input size rmin and a maximum input size rmax. As illustrated in FIG. 6B as broken lines, the minimum input size rmin is obtained by reducing a radius r of the command gesture G4 having the specified size with a predetermined ratio (e.g., 30%), and the maximum input size rmax is obtained by extending the radius r with a predetermined ratio (e.g., 150%). As for the specified size of the command gesture G4, a value corresponding to the size and resolution of the touch panel 211 is preliminarily stored in the storage unit 213. The gesture determination unit 212 sets the specified size of the command gesture G4, the minimum input size, and the maximum input size based on the size and resolution of the touch panel 211 of the smartphone which is installed with the application.

The reason why, when starting the input of a gesture, the input guide 212a is displayed and the first gesture determination area Ga0 is temporarily fixed as above is that the operator U is to be notified of the form of the command gesture G4 to increase the determination rate of the gesture immediately after starting the input. In addition, when starting the remote operation of the subject vehicle V, the operator U is likely to look at the remote operation device 21 in order to operate the remote operation device 21. Accordingly, by displaying the input guide 212a at a preliminarily set position to set the first gesture determination area Ga0, it is possible to suggest the operation necessary for the operator U and thus suppress the uncomfortable feeling given to the operator U. On the contrary, after the autonomous parking control of the subject vehicle V is started, the operator U is likely to look aside from the remote operation device 21 to monitor the subject vehicle V. It is thus highly possible that the touch operation deviates from the first gesture determination area Ga0; therefore, by setting a new gesture determination area in accordance with the input position of the touch operation, the autonomous travel control of the subject vehicle V can be continued. The reason why the first gesture determination area Ga0 is defined by the minimum input size rmin and the maximum input size rmax is to determine that the input gesture is the command gesture not only when the input gesture has the same size as that of the command gesture G4 having the specified size but also when the input gesture has a size within a predetermined range, that is, when the size of the input gesture is smaller or larger than the specified size.

Figure 6C:
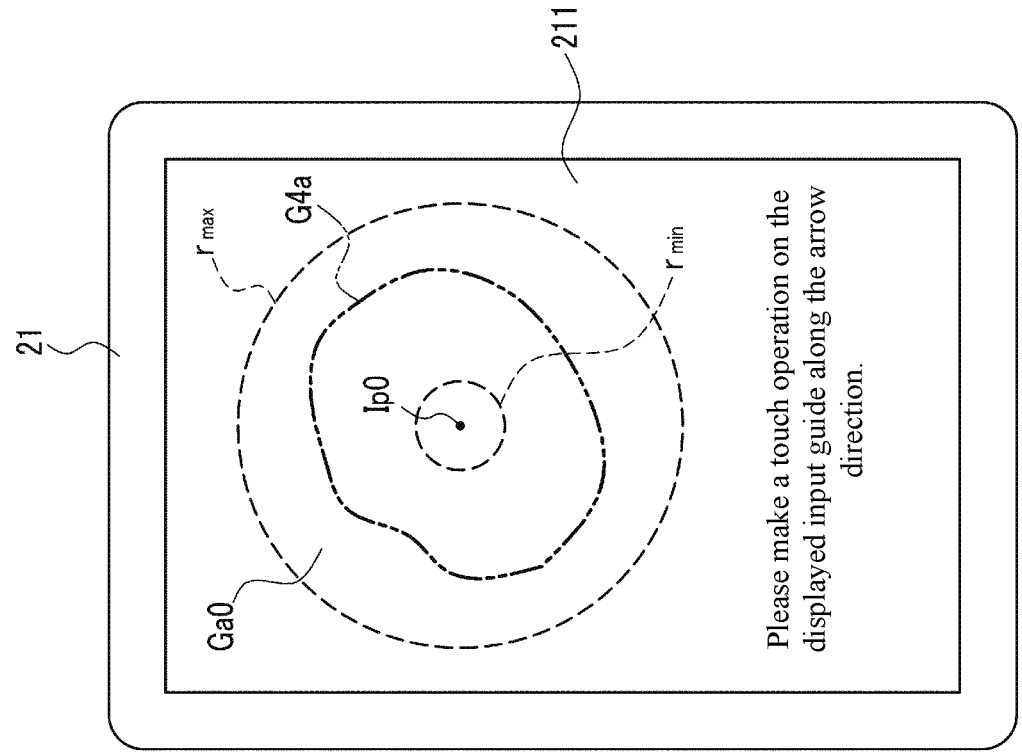
FIG. 6C is an explanatory diagram illustrating a state in which a gesture is input in the first gesture determination area of FIG. 6B.

The gesture determination unit 212 determines whether or not the input gesture is a circular-shaped gesture such as the specified command gesture G4 and whether or not the size of the input gesture falls within the first gesture determination area Ga0. In addition, the gesture determination unit 212 determines whether or not the input speed of the gesture is within a preliminarily set predetermined range. When the input gesture is a circular-shaped gesture such as the command gesture G4, the size of the input gesture falls within the first gesture determination area Ga0, and the input speed of the gesture is within the predetermined range, the gesture determination unit 212 determines that the command gesture G4 is input. Therefore, as illustrated in FIG. 6C, even when the input gesture G4a serpentines in the first gesture determination area Ga0 and has a deformed shape such as a deformed elliptical shape, the gesture determination unit 212 determines that it is the command gesture G4. The reason why the input speed of the gesture is used for determining the command gesture is to distinguish a gesture that is input due to some object touching the touch panel 211 from the gesture of the operator U.

The gesture determination unit 212 hides the input guide 212a at a time point when a determination is made that the input gesture is the command gesture G4 or at a time point when a new gesture determination area is set in accordance with a change in the input position of the gesture. When detecting that the command gesture continues to be input along the input guide 212a, the gesture determination unit 212 may continue to display the input guide 212a. When a new gesture determination area is set, the gesture determination unit 212 may display the input guide 212a at the position of the new gesture determination area.

The input of the gesture on the touch panel 211 is performed by the touch operation of the operator U, so the input position of the gesture moves at all times. The gesture determination unit 212 therefore sets a new gesture determination area in accordance with the movement of the input position of the gesture with respect to the touch panel 211. Also when the operator U who understands in advance that the input position and input size of the gesture are variable inputs the gesture while ignoring the input guide 212a, the gesture determination unit 212 sets a new gesture determination area in accordance with the input position. For the setting of the new gesture determination area, detected values xraw and yraw of the touch operation detected by the touch panel 211 and moving average values xmean and ymean of the detected values are used.

Figure 7A:
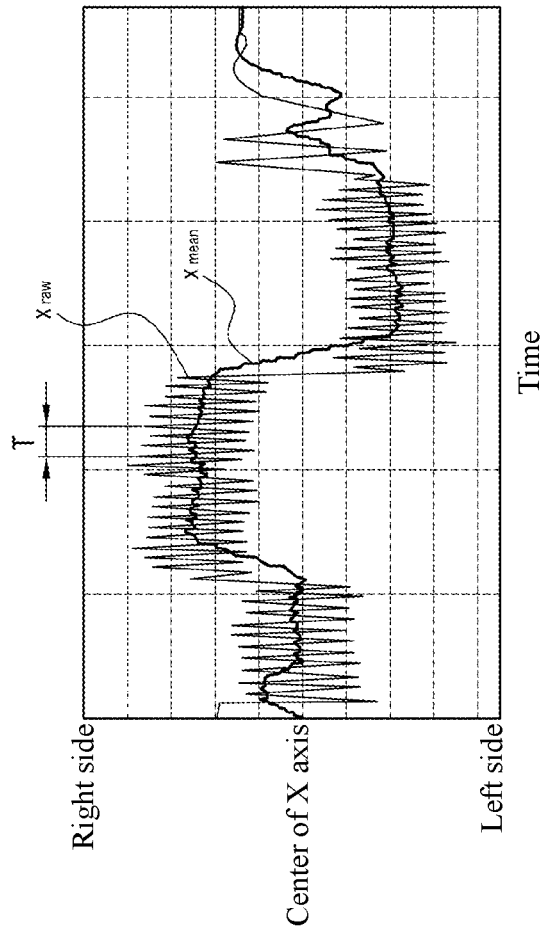
FIG. 7A and FIG. 7B are a set of graphs each illustrating a detected value of the touch operation detected on the touch panel of FIG. 4 and a moving average value of the detected value.
Figure 7B:
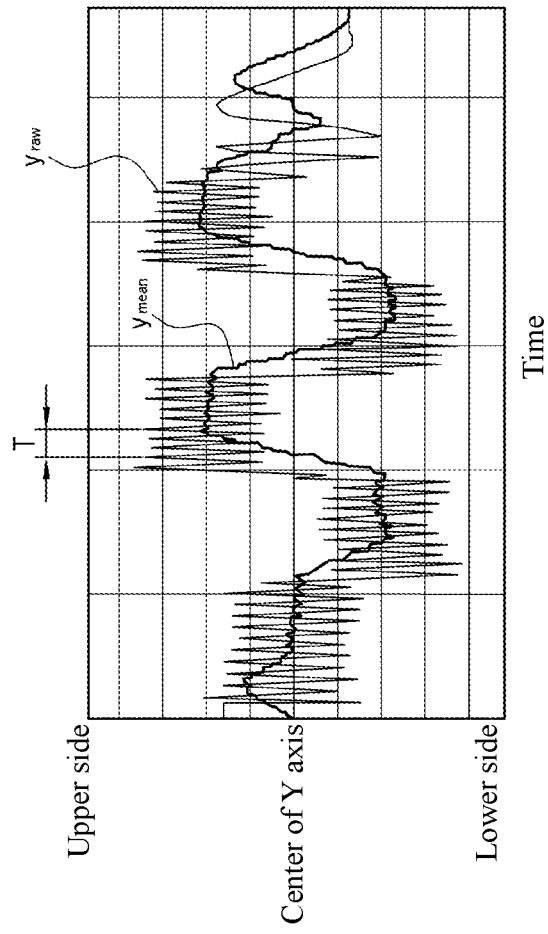

The graphs of FIG. 7A and FIG. 7B each illustrate an example of the detected value of the touch operation detected by the touch panel 211 when the operator U inputs a gesture on the touch panel 211. In the graph of FIG. 7A, the horizontal axis represents time and the vertical axis represents the detected value xraw of the touch operation in the X-axis direction and the moving average value xmean of the detected value xraw. The positive side of the vertical axis in the graph of FIG. 7A indicates the right side of the center line on the X axis of the touch panel 211 while the negative side indicates the left side of the center line on the X axis. Likewise, in the graph of FIG. 7B, the horizontal axis represents time and the vertical axis represents the detected value yraw of the touch operation in the Y-axis direction and the moving average value ymean of the detected value yraw. The positive side of the vertical axis in the graph of FIG. 7B indicates the upper side of the center line on the Y axis of the touch panel 211 while the negative side indicates the lower side of the center line on the Y axis. The detected values xraw and yraw of the touch panel 211 are stored in the storage unit 213 at any time. The moving average values xmean and ymean are calculated by the gesture determination unit 212 and stored in the storage unit 213.

Figure 8:
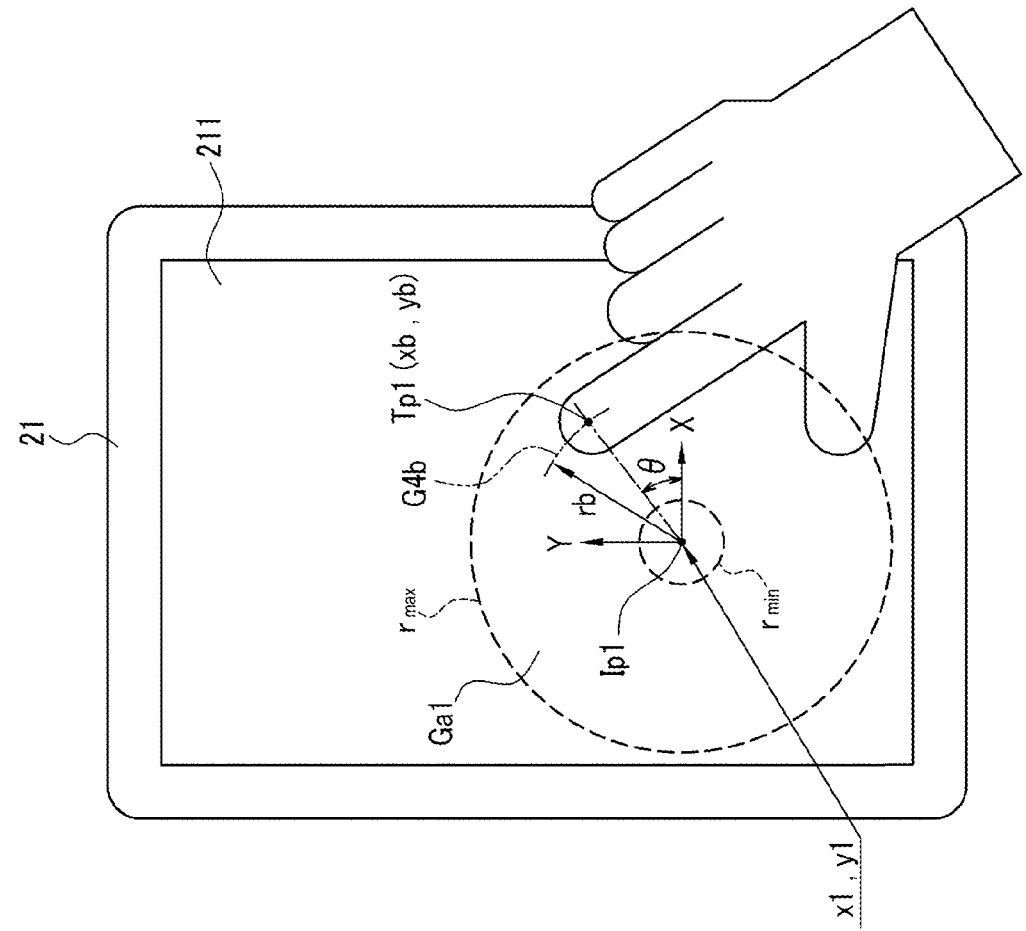
FIG. 8 is an explanatory diagram illustrating a state in which the gesture determination area is set from a gesture that is input at an arbitrary position on the touch panel of FIG. 4.

As illustrated in FIG. 8, for example, when a gesture G4b is input on the touch panel 211 by the touch operation of the operator U, the gesture determination unit 212 acquires from the storage unit 213 the coordinates (xb, yb) of a current touch position Tp1 of the operator U with respect to the touch panel 211. The gesture determination unit 212 also acquires from the storage unit 213 the moving average values (xmean, ymean) of the past several seconds (referred to as a radius determination time T, hereinafter) until the touch position reaches Tp1. Using the following Mathematical Formulae 1 and 2, the gesture determination unit 212 calculates a radius rb of the gesture G4b until the touch position moves to Tp1 and an angle θ formed between the X axis and a line that includes the touch position Tp1 and a center position Ip1. Then, the gesture determination unit 212 calculates coordinates (X1, Y1) of the center position Ip1 of the gesture G4b based on the radius rb and the angle θ and sets a new gesture determination area Ga1 based on the center position Ip1. Thus, the gesture determination unit 212 sets a new gesture determination area at all times in accordance with the movement of the input position of the gesture.

[Mathematical Formula 1]
$$r = \sqrt{(x - x_{mean})^2 + (y - y_{mean})^2}$$

[Mathematical Formula 2]
$$\theta = \tan^{-1}\frac{(y - y_{mean})}{(x - x_{mean})} \times \frac{180}{\pi}[deg]$$

The gesture may temporarily become undetectable by the gesture determination unit 212 during the input of the gesture on the touch panel 211. The cases in which the gesture becomes undetectable by the gesture determination unit 212 include a case in which the finger of the operator U is released from the touch panel 211, a case in which the input gesture is not determined to be the command gesture, and a case in which the operator U ends the input of the gesture in mid-course. Examples of the case in which the finger of the operator U is released from the touch panel 211 include a case in which the finger of the operator U falls outside the touch panel 211. When the gesture becomes undetectable during the input of the gesture on the touch panel 211, the gesture determination unit 212 switches the setting process for the gesture determination area based on the time during which the gesture cannot be detected (non-detection time) and the above-described radius determination time T.

Figure 9:
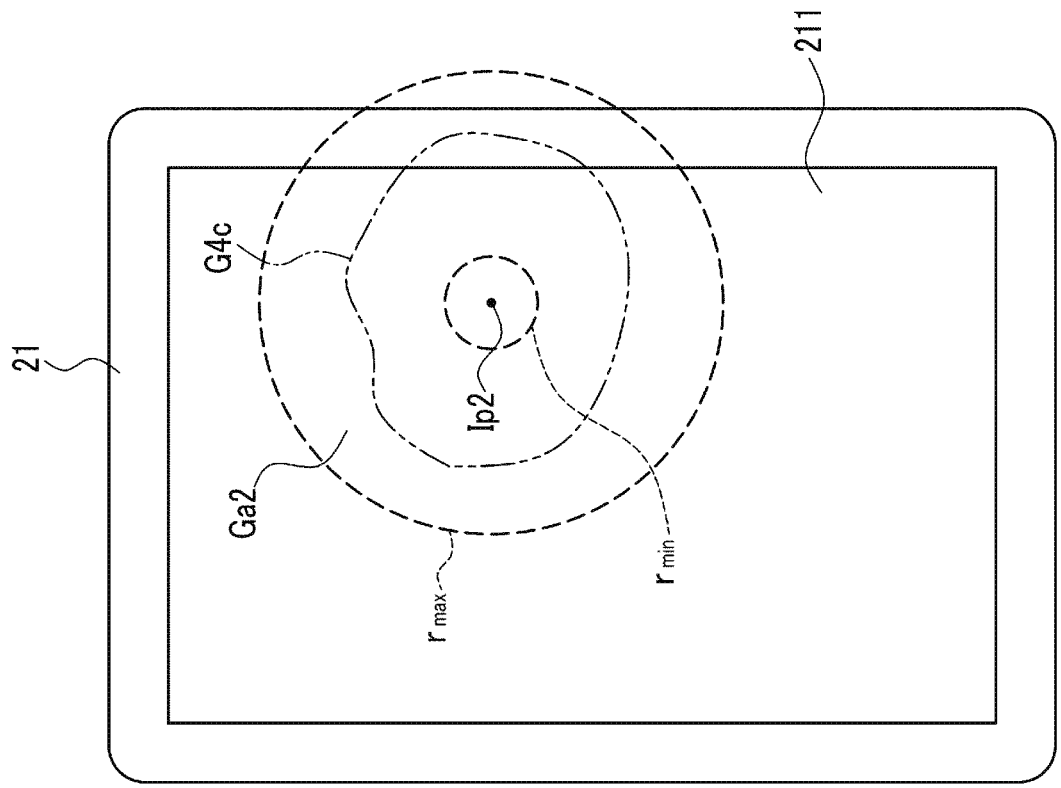
FIG. 9 is an explanatory diagram illustrating a state in which the gesture falls outside the touch panel of FIG. 4.

For example, when the finger of the operator U is temporarily released from the touch panel 211 during the input of the gesture and the gesture determination unit 212 cannot detect the gesture, or when the finger of the operator U falls outside the touch panel 211 and the gesture determination unit 212 cannot detect the gesture, the non-detection time is considered to be relatively short. The gesture determination unit 212 therefore compares the non-detection time with the radius determination time T. When determining that the non-detection time is less than the radius determination time T, the gesture determination unit 212 calculates the moving average value using the coordinates of the touch position detected immediately before the gesture temporarily becomes undetectable, and sets a new gesture determination area using the calculation result. That is, the gesture determination unit 212 sets the new gesture determination area without using the touch position during the non-detection time. For example, in the example illustrated in FIG. 9, when it is detected that the finger of the operator U temporarily falls outside the touch panel 211 during the input of the gesture, the gesture determination unit 212 calculates the moving average value using the coordinates of the touch position immediately before the finger falls outside the touch panel 211, and sets a new gesture determination area Ga2 using the calculation result. In the case in which the non-detection time of the gesture is less than the radius determination time T, even when a new gesture determination area is set without using the touch position during the non-detection time, the set position of the gesture determination area does not deviate significantly. Therefore, the determination result of the gesture is not significantly affected.

When the gesture determination unit 212 does not determine that the input gesture is the command gesture due to an input error of the operator U, the non-detection time of the gesture is considered to be relatively long as compared with when the finger is released from the touch panel 211. Therefore, when determining that the non-detection time of the gesture is not shorter than the radius determination time T, the gesture determination unit 212 stores the gesture determination area, which is set immediately before the gesture becomes undetectable, as a second gesture determination area in the storage unit 213. Then, when detecting the input of the gesture again, the gesture determination unit 212 reads the second gesture determination area from the storage unit 213 to determine the gesture. For example, in the example illustrated in FIG. 9, the gesture determination unit 212 stores the gesture determination area Ga2, which is set immediately before the gesture G4c becomes not detected, as the second gesture determination area in the storage unit 213. Then, when detecting the input of the gesture again, the gesture determination unit 212 reads the gesture determination area Ga2 from the storage unit 213 to determine the gesture. When the operator U continuously inputs the gesture, it is highly likely that the operator U continues the input at the same input position. Therefore, when the gesture becomes undetectable due to an input error, the determination rate of the gesture can be increased by using the gesture determination area which is set immediately before the gesture becomes undetectable.

When the operator U ends the input of the gesture in mid-course, the non-detection time of the gesture is considered to be longer than that when the finger is released from the touch panel 211 or when the gesture being input is not determined to be the command gesture. Therefore, when determining that the gesture non-detection time is not less than a preliminarily set input restart standby time, the gesture determination unit 212 displays the input guide 212a on the touch panel 211 and sets the first gesture determination area Ga0 based on the preliminarily set center position Ip0. The input restart standby time is longer than the radius determination time T and is preferably set, for example, to a time of several seconds. When the non-detection time of the gesture becomes long to some extent, the determination rate of the restarted gesture can be increased by displaying the input guide 212a and setting the first gesture determination area Ga0.

The command unit 214 and communication unit 215 of the remote operation device 21 will then be described. When the gesture determination unit 212 determines that the gesture detected on the touch panel 211 is the command gesture G4, the command unit 214 generates the execution command signal for controlling the subject vehicle V to execute the autonomous parking control using the autonomous travel control function. The command unit 214 inputs the generated execution command signal to the communication unit 215. As the CPU of a smartphone that serves as the remote operation device 21 operates in accordance with the application, the command unit 214 functions.

The communication unit 215 uses the communication function which is preliminarily provided in a smartphone that serves as the remote operation device 21. The communication unit 215 is, for example, a wireless communication unit such as that for the Bluetooth (registered trademark). In the remote control mode, the communication unit 215 is connected to a wireless communication unit (not illustrated) equipped in the subject vehicle V and transmits the execution command signal to the subject vehicle V. A wireless local area network (LAN) such as Wi-Fi (registered trademark), a mobile phone line, or the like may also be used as the communication unit 215.

As illustrated in FIG. 1, the execution command signal transmitted to the subject vehicle V is input to the route following controller 16 and the target vehicle speed generator 17. As described above, the relative position between the subject vehicle V and the extension unit 22 is input from the position detector 201 to the route following controller 16 and the target vehicle speed generator 17. When the distance between the subject vehicle V and the extension unit 22 is within the remote operation distance and the execution command signal from the remote operation device 21 is input, the route following controller 16 outputs the target steering angle to the steering angle controller 18. Likewise, when the distance between the subject vehicle V and the extension unit 22 is within the remote operation distance and the execution command signal from the remote operation device 21 is input, the target vehicle speed generator 17 outputs the target vehicle speed to the vehicle speed controller 19. On the basis of the target steering angle from the route following controller 16, the steering angle controller 18 generates a control signal for operating the steering actuator provided in the steering system of the subject vehicle. On the basis of the target vehicle speed from the target vehicle speed generator 17, the vehicle speed controller 19 generates a control signal for operating the accelerator actuator provided in the drive system of the subject vehicle V.

In the case in which the distance between the subject vehicle V and the extension unit 22 is longer than the remote operation distance, the route following controller 16 does not output the target steering angle to the steering angle controller 18 even when the execution command signal from the remote operation device 21 is input. Likewise, in the case in which the distance between the subject vehicle V and the extension unit 22 is longer than the remote operation distance, the target vehicle speed generator 17 does not output the target vehicle speed to the vehicle speed controller 19 even when the execution command signal from the remote operation device 21 is input. That is, in the case in which the distance between the subject vehicle V and the extension unit 22 is longer than the remote operation distance, the autonomous parking control is not executed even when the command gesture is input from the remote operation device 21.

Figure 10:
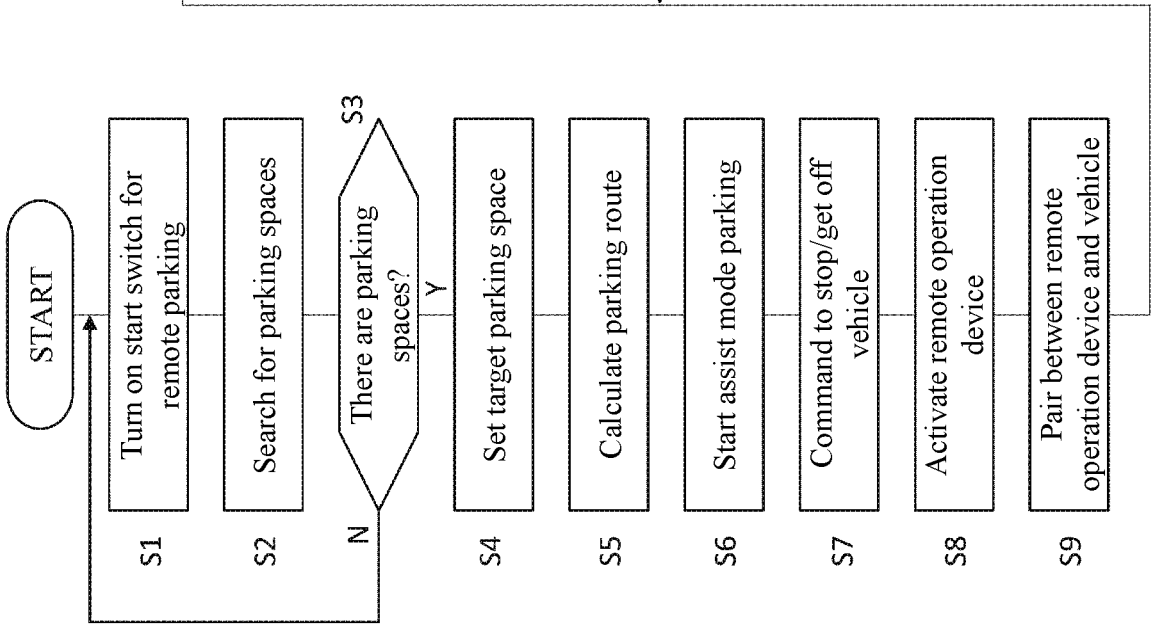
FIG. 10 is a flowchart illustrating an example of a control procedure executed in the remote parking system of FIG. 1.
Figure 11:
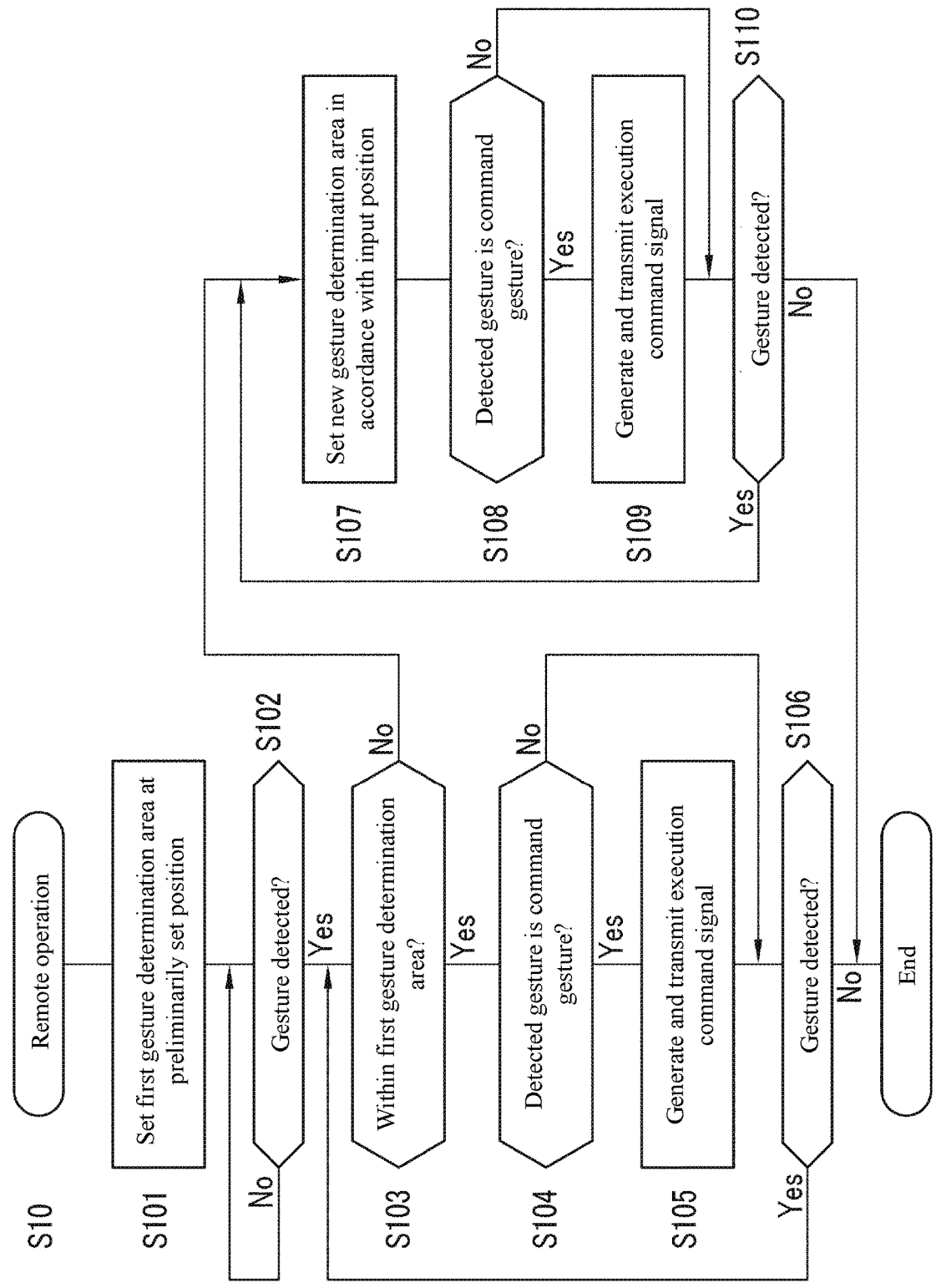
FIG. 11 is a flowchart illustrating a procedure of the remote operation of FIG. 10.
Figure 12:
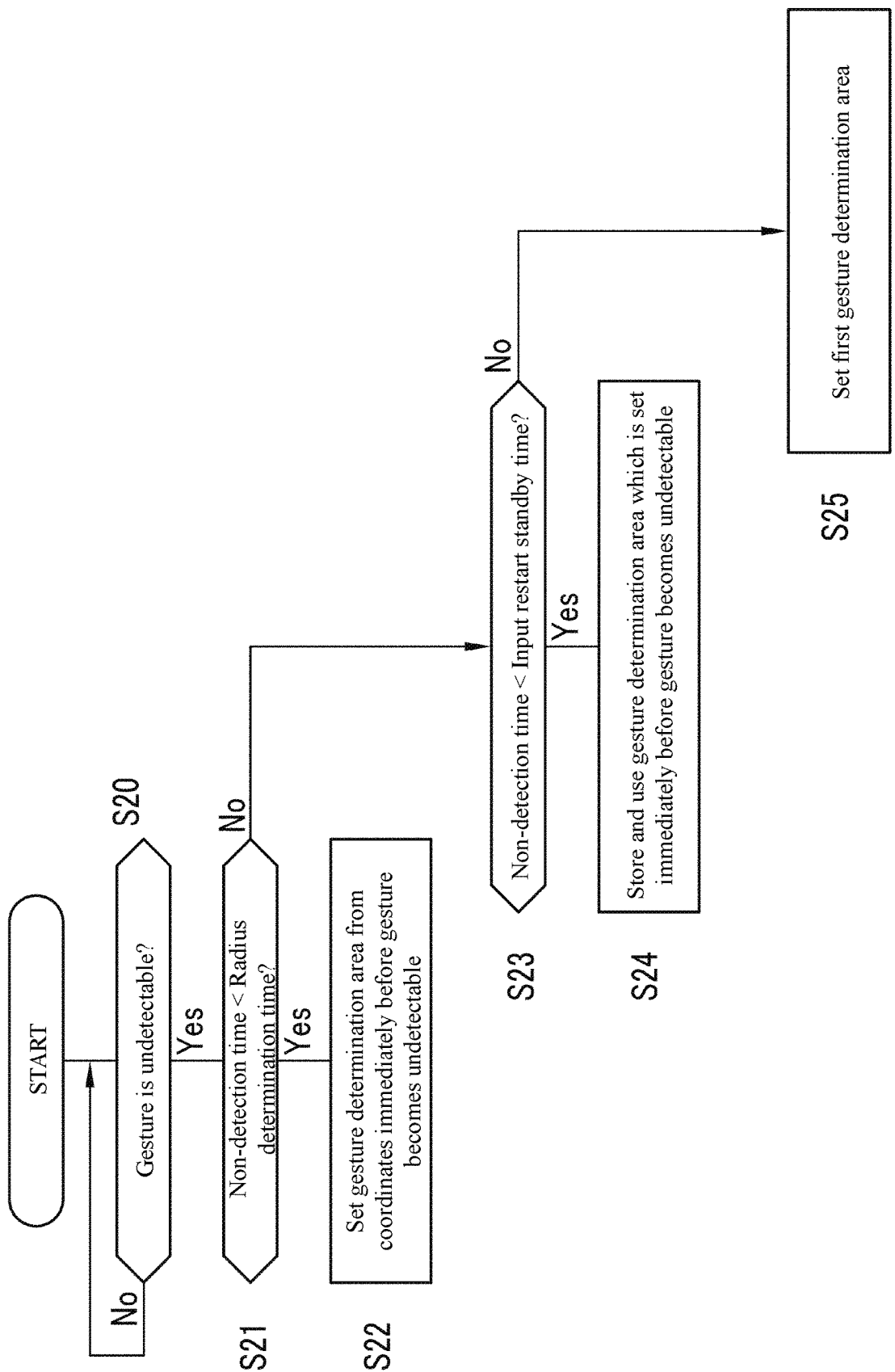
FIG. 12 is a flowchart illustrating a procedure of setting the gesture determination area when the gesture becomes not detected temporarily.

The control flow of the remote parking system 1 of the present embodiment will then be described with reference to FIGS. 10, 11, and 12. Here, a scene will be described in which the reverse parking illustrated in FIG. 2 is executed by the autonomous parking control. FIG. 10 is a flowchart illustrating a control procedure executed in the remote parking system 1 of the present embodiment. FIG. 11 is a flowchart illustrating a procedure in the remote operation device 21 of detecting and determining the gesture and transmitting the execution command signal. FIG. 12 is a flowchart illustrating a procedure for setting the gesture determination area when the input of the gesture is detected after the gesture temporarily becomes undetectable.

First, when the subject vehicle V arrives at the position P1 in the vicinity of the target parking space TPS, in step S1 illustrated in FIG. 10, the operator U such as the driver turns on the remote parking start switch of the onboard target parking space setting device 11 to select the remote entry mode. In step S2, the target parking space setting device 11 searches for one or more available parking spaces for the subject vehicle V using a plurality of onboard cameras or the like. In step S3, the target parking space setting device 11 determines whether or not there are one or more available parking spaces. When there are one or more available parking spaces, the process proceeds to step S4, while when there are no available parking spaces, the process returns to step S1. When no available parking spaces are detected in step S2, the operator may be informed of this fact via a language display or voice, such as "there are no parking spaces," and this process may be concluded.

In step S4, the target parking space setting device 11 controls the onboard display to display the available parking spaces and prompts the operator U to select a desired parking space. When the operator U selects a specific parking space TPS, the target parking space setting device 11 outputs the target parking position information to the parking route generator 14. In step S5, the parking route generator 14 generates the parking routes R1 and R2 illustrated in FIG. 2 from the current position P1 of the subject vehicle V and the parking space TPS which represents a target parking position. The object deceleration calculator 15 calculates the deceleration start timing in the autonomous parking control based on the object information detected by the object detector 13. The parking routes R1 and R2 generated by the parking route generator 14 are output to the route following controller 16, and the deceleration start timing calculated by the object deceleration calculator 15 is output to the target vehicle speed generator 17.

Through the above processes, the autonomous parking control comes into a standby state; therefore, when the operator U is prompted to accept the start of the autonomous parking control and then accepts the start in step S6, the autonomous travel control in the assist mode is started. In the reverse parking illustrated in FIG. 2, once the subject vehicle V moves forward while turning right from the current position P1 illustrated in FIG. 2 and reaches the position of turn for parking P3, the subject vehicle V moves backward while turning left to an intermediate stop position P4.

In step S7, as the position of the subject vehicle V reaches the intermediate stop position P4, the subject vehicle V is stopped and the operator U is prompted to get off the subject vehicle V. When the operator U is prompted to get off the subject vehicle V in step S7 and gets off with the remote operation device 21, step S7 is followed by step S8, in which the operator U activates the remote operation device 21. This starts the remote operation. Examples of the start input for the remote operation by the remote operation device 21 include the activation of the application installed in the remote operation device 21, the operation of unlocking the doors, the operation of locking/unlocking the doors, and the combination of these and the activation of the application. The subject vehicle V is in a stop state during steps S7 to S9.

In step S9, a pairing process between the remote operation device 21 and the subject vehicle V is performed. When the pairing process of step S9 enables the subject vehicle V to authenticate the remote operation device 21 so that the command can be received, the remote operation is started in step S10.

At the start of remote operation using the remote operation device 21, as illustrated in FIG. 11, the gesture determination unit 212 performs the initial setting in step S101. In this initial setting, as illustrated in FIG. 6A, the input guide 212a and the message "Please make a touch operation on the displayed input guide along the arrow direction" are displayed on the touch panel 211. In addition, as illustrated in FIG. 6B, the gesture determination unit 212 sets the first gesture determination area Ga0 based on the center position Ip0 of the input guide 212a.

The operator U performs a touch operation along the input guide 212a and inputs a circular-shaped gesture on the touch panel 211. In the remote parking system 1 of the present embodiment, the position and size of the gesture determination area are variable, and the operator U can therefore input the gesture with an arbitrary size at an arbitrary position on the touch panel 211 while ignoring the input guide 212a. The detected values xraw and yraw of the touch operation detected by the touch panel 211 are stored in the storage unit 213 at any time. The moving average values xmean and ymean are calculated by the gesture determination unit 212 and stored in the storage unit 213.

In step S102, the touch panel 211 detects the gesture which is input by the touch operation of the operator U. When the gesture is detected on the touch panel 211, the gesture determination unit 212 determines in step S103 whether or not the detected gesture is input within the first gesture determination area Ga0. When the detected gesture is input within the first gesture determination area Ga0, the gesture determination unit 212 determines in step S104 whether the detected gesture is a circular-shaped gesture such as the command gesture G4 and whether the detected gesture is input at an input speed within a preliminarily set predetermined range.

When the detected gesture is not the command gesture G4, or when the input speed falls outside the predetermined range, the process proceeds to step S106 to detect the next gesture. On the contrary, when the detected gesture is the command gesture G4 and the input speed falls within the predetermined range, the process proceeds to step S105, in which the command unit 214 generates the execution command signal, and the communication unit 215 sends the execution command signal to the subject vehicle V. In the next step S106, when the detection of the gesture continues, the process returns to step 103, from which the determination of the gesture and the transmission of the execution command signal are repeated.

Referring again to step 103, when the detected gesture is not input within the first gesture determination area Ga0, the operation of the gesture determination unit 212 proceeds to step S107, in which the gesture determination unit 212 sets a new gesture determination area based on the input position of the current gesture. As described above, the gesture determination unit 212 sets the new gesture determination area based on the coordinates of the current touch position of the operator U on the touch panel 211 and the moving average values until the touch position reaches the current touch position.

In the next step S108, the gesture determination unit 212 uses the newly set gesture determination area to determine whether the detected gesture is a circular-shaped gesture such as the command gesture G4 and whether the detected gesture is input at an input speed within a preliminarily set predetermined range. When the detected gesture is not the command gesture G4, or when the input speed falls outside of the predetermined range, the process proceeds to step S110 to detect the next gesture. On the contrary, when the detected gesture is the command gesture G4 and the input speed falls within the predetermined range, the process proceeds to step S109, in which the command unit 214 generates the execution command signal and the communication unit 215 sends the execution command signal to the subject vehicle V. In the next step S110, when the detection of the gesture continues, the process returns to step 107, from which the setting of a new gesture determination area, the determination of the gesture, and the transmission of the execution command signal are repeated.

Referring again to FIG. 10, in step S11, the extension unit 22 and the base unit 20 are used to detect the relative position of the extension unit 22 with respect to the subject vehicle V, that is, the relative position between the operator U, who carries the extension unit 22, and the subject vehicle V. The base unit 20 outputs the detected relative position to the route following controller 16 and the target vehicle speed generator 17. When the distance between the subject vehicle V and the extension unit 22 is within the remote operation distance and the execution command signal from the remote operation device 21 is input, the route following controller 16 outputs the target steering angle to the steering angle controller 18. Likewise, when the distance between the subject vehicle V and the extension unit 22 is within the remote operation distance and the execution command signal from the remote operation device 21 is input, the target vehicle speed generator 17 outputs the target vehicle speed to the vehicle speed controller 19. On the basis of the target steering angle from the route following controller 16, the steering angle controller 18 generates a control signal for operating the steering actuator provided in the steering system of the subject vehicle. On the basis of the target vehicle speed from the target vehicle speed generator 17, the vehicle speed controller 19 generates a control signal for operating the accelerator actuator provided in the drive system of the subject vehicle V. This allows the autonomous parking control to be executed in the next step S12.

The processes from step S10 to step S13, which is to be described below, are executed at predetermined time intervals until the subject vehicle V arrives at the target parking space TPS in step S13. In step S13, a determination is made as to whether or not the subject vehicle V has arrived at the target parking space TPS. When the subject vehicle V has not arrived at the parking space TPS, the process returns to step S10, while when the subject vehicle V has arrived at the target parking space TPS, the subject vehicle V is stopped and the process is concluded. Thus, the autonomous travel control in the assist mode is executed along the travel route from the current position P1 of the subject vehicle V to the intermediate stop position P4, and the autonomous travel control in the remote control mode is executed along the travel route from the intermediate stop position P4 to the target parking space TPS.

When the remote operation is performed using the remote operation device 21 in step S10, the gesture may become not detected. In step S20 illustrated in FIG. 12, the gesture determination unit 212 measures the non-detection time when the input of the gesture temporarily becomes undetectable. Step S20 is followed by step S21, in which the gesture determination unit 212 compares the non-detection time with the radius determination time T used for detecting the input position of the gesture. When the non-detection time is less than the radius determination time T, conceivable cases include a case in which the finger of the operator U is temporarily released from the touch panel 211 and a case in which the finger of the operator U temporarily falls outside the touch panel 211. The operation of the gesture determination unit 212 therefore proceeds to the next step S22, in which the gesture determination unit 212 calculates the moving average value using the coordinates of the touch position detected immediately before the gesture becomes undetectable, and sets a new gesture determination area using the calculation result. In the case in which the non-detection time of the gesture is less than the radius determination time T, even when a new gesture determination area is set without using the touch position during the non-detection time, the set position of the gesture determination area does not deviate significantly. Therefore, the determination result of the gesture is not significantly affected.

In step S21, when the non-detection time of the gesture is not less than the radius determination time T, the process proceeds to step S23, in which the non-detection time of the gesture is compared with a preliminarily set input restart standby time. When the non-detection time is less than the input restart standby time, conceivable cases include a case in which the input gesture is not determined to be the command gesture. Therefore, if the gesture determination area is set based on the gesture which is not determined to be the command gesture, the setting position of the gesture determination area may deviate. In such a case, the operation of the gesture determination unit 212 proceeds to the next step S24. In step S24, the gesture determination unit 212 stores the gesture determination area, which is set immediately before the gesture becomes undetectable, in the storage unit 213 as the second gesture determination area. Then, when the input of the gesture is detected, the second gesture determination area is read from the storage unit 213 to determine the gesture.

Referring again to step S23, when the non-detection time of the gesture is not less than the input standby time, the process proceeds to step S25. When the non-detection time of the gesture is not less than the input standby time, conceivable cases include a case in which the operator U ends the input of the gesture in mid-course. Therefore, the gesture determination unit 212 displays the input guide 212a on the touch panel 211 and sets the first gesture determination area Ga0 based on the preliminarily set center position Ip0. This can increase the determination rate of the restarted gesture.

As described above, according to the remote parking system 1 to which the remote control method and remote control device for a vehicle of the present invention are applied, the input position at which the touch operation is performed by the operator U is detected on the touch panel 211 of the remote operation device 21, and the position of the gesture determination area, which is set by the gesture determination unit 212, is made variable in accordance with the input position. In addition, the gesture is detected from the gesture determination area, and the gesture determination unit 212 determines whether or not the detected gesture is the command gesture which is preliminarily set. Then, when the gesture is the command gesture, the subject vehicle V having the autonomous travel control function is controlled to execute the autonomous parking control as the autonomous travel control. This allows the gesture to be input at an arbitrary position on the touch panel 211, and the subject vehicle V can therefore execute the autonomous parking control regardless of the input position of the gesture. Moreover, the gesture can be input without worrying about the input position, and the operability of the remote operation device 21 is therefore improved. Furthermore, as compared with the case of using the entire touch panel 211 as the gesture determination area, the gesture can be determined in a small gesture determination area. This can reduce the processing load required for the gesture determination.

In addition, the size of the gesture determination area with respect to the touch panel 211 is made variable. This allows the gesture of any size to be input on the touch panel 211, and the subject vehicle V can therefore execute the autonomous parking control regardless of the size of the gesture. Furthermore, the size of the gesture determination area is made variable between the preliminarily set minimum input size and maximum input size, and it is thus possible to suppress the input of gestures having extremely different sizes.

Moreover, the first gesture determination area Ga0 is set at a preliminarily set position and a new gesture determination area is set in accordance with the input position of the touch operation on the touch panel 211; therefore, the determination rate for the gesture when starting input can be increased, and the subject vehicle V can promptly start the autonomous parking control. Furthermore, a new gesture determination area is set in accordance with the change in the input position of the touch operation; therefore, even when the input position of the gesture deviates from the first gesture determination area, the subject vehicle V can be controlled to continue the autonomous parking control. In particular, when starting the remote operation of the subject vehicle V, the operator U is likely to look at the remote operation device 21. Accordingly, by displaying the input guide 212a at a preliminarily set position to set the first gesture determination area Ga0, it is possible to suggest the operation necessary for the operator U and thus suppress the uncomfortable feeling given to the operator U. On the contrary, after the autonomous parking control of the subject vehicle V is started, the operator U is likely to look aside from the remote operation device 21 to monitor the subject vehicle V. It is thus highly possible that the touch operation deviates from the first gesture determination area Ga0; therefore, by setting a new gesture determination area in accordance with the input position of the touch operation, the autonomous travel control of the subject vehicle V can be continued.

When the gesture temporarily becomes undetectable, the gesture determination area, which is set immediately before the gesture becomes undetectable, is stored as the second gesture determination area, and when the input of the gesture is detected, the second gesture determination area is used for the determination of the gesture. When the gesture input is stopped temporarily and restarted, it is highly likely that the input of the gesture is restarted at the input position before the stop. Therefore, by using the second gesture determination area for the determination when restarting the input of the gesture, the determination rate of the gesture can be increased.

Moreover, when the input of the gesture is detected again after the gesture becomes undetectable, the gesture can be determined using the first gesture determination area. For example, when the input of the gesture is temporarily stopped and then restarted after a relatively long time, the determination rate of the gesture can be increased by setting the first gesture determination area.

The cases in which the gesture becomes undetectable include a case in which the finger of the operator U is released from the touch panel 211, a case in which the gesture is not determined to be the command gesture, and a case in which the operator U ends the input of the gesture in mid-course. According to the present embodiment, therefore, in any of the case in which the finger of the operator U is released from the touch panel 211, the case in which the gesture is not determined to be the command gesture, and the case in which the operator U ends the input of the gesture in mid-course, the gesture determination area which is set immediately before may be stored and used, or the first gesture determination area may be used.

Moreover, when the lateral direction and longitudinal direction of the touch panel 211 are defined as the X axis and the Y axis, respectively, the command gesture in the present embodiment is the touch operation in which the coordinates of the input position by the touch operation of the operator vary continuously in at least one of the X axis and the Y axis. Therefore, even an operator who is unfamiliar with the touch operation on the touch panel 211 can easily input the command gesture.

Furthermore, the command gesture can be defined as the touch operation of drawing the trajectory of a figure on the touch panel 211 so that the starting end at which one input of the gesture is started and the terminating end at which the one input of the gesture is terminated overlap each other. As such a command gesture, the touch operation of drawing the trajectory of a circular-shaped figure on the touch panel 211 can be applied. This allows the command gesture to be input in a distinctly different form from other monotonous and simple gestures, and an erroneous determination of the gesture can therefore be suppressed.

When the command gesture is the touch operation of drawing the trajectory of a circular-shaped figure on the touch panel 211, the gesture determination area can be defined by the center coordinates and radius of the circular-shaped figure, and the gesture determination area can therefore be set with a relatively simple process as compared with that for a gesture composed of a complicated figure.

Moreover, in the present embodiment, when the gesture becomes not detected, the subject vehicle V is controlled to stop the autonomous parking control. Therefore, the operation of controlling the subject vehicle V to stop the autonomous parking control is not necessary, and the remote operation of the subject vehicle V is thus easy.

Furthermore, in the present embodiment, the autonomous parking control for parking the subject vehicle V is executed as the autonomous travel control, and the subject vehicle V can therefore be remotely operated and parked from a distant position.

Second Embodiment

The description will then be made for a second embodiment of the remote parking system to which the vehicle remote control method and vehicle remote control device of the present invention are applied. For the same configurations as those of the first embodiment, the same reference numerals as those of the first embodiment will be used, and detailed description thereof will be omitted.

In the first embodiment, when starting the input of the gesture, the first gesture determination area Ga0 is set at a preliminarily set position on the touch panel 211 regardless of the input position of the touch operation with respect to the touch panel 211. Then, when the input position of the touch operation is not within the first gesture determination area Ga0, a new gesture determination area is set in accordance with the input position. On the other hand, in the present embodiment, the first gesture determination area Ga0 is set at a preliminarily set position of the touch panel 211 before the autonomous travel control of the subject vehicle V is started. Then, after the autonomous travel control of the subject vehicle V is started, a new gesture determination area is set in accordance with the input position of the touch operation. That is, in the present embodiment, the setting of the gesture determination area is switched between before and after the start of the autonomous travel control of the subject vehicle V.

Figure 13:
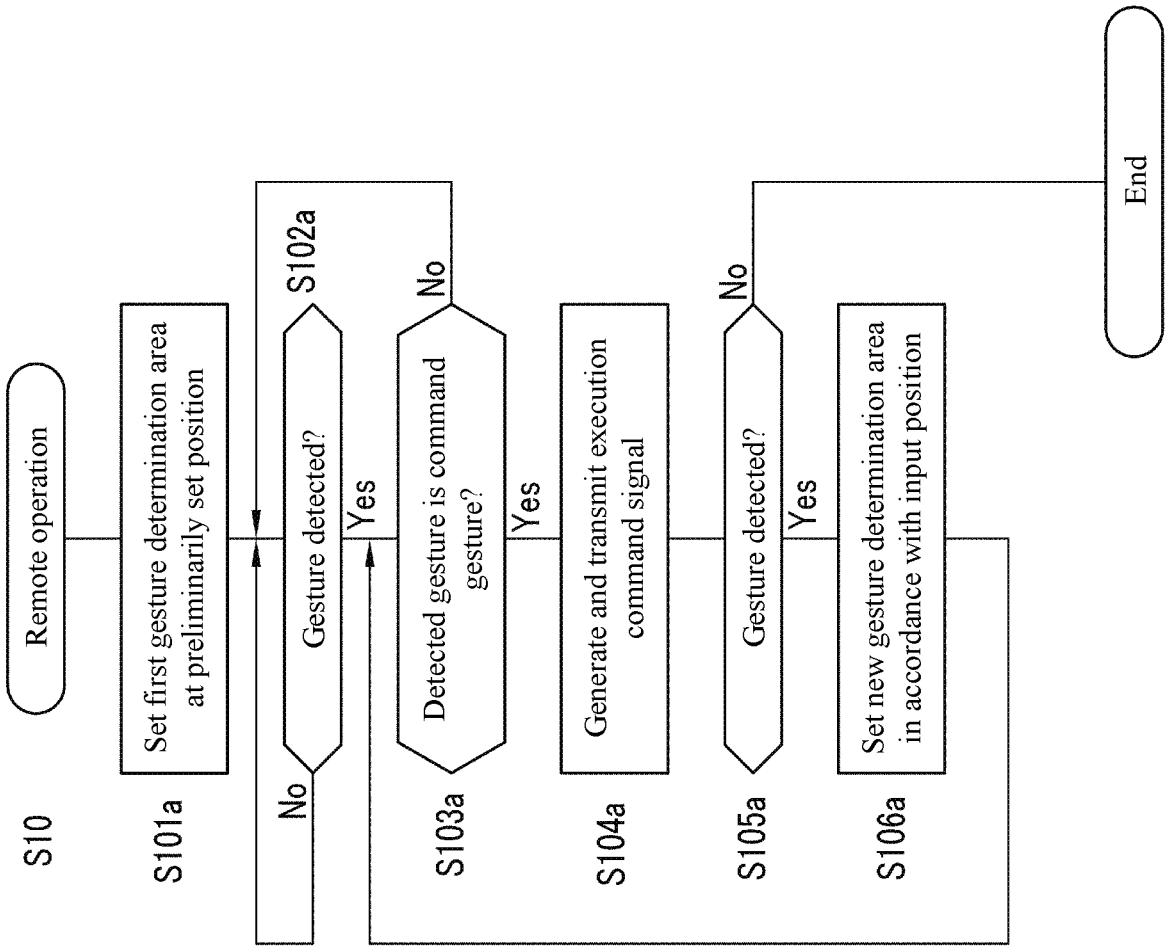
FIG. 13 is a flowchart illustrating a procedure of the remote operation of a second embodiment.

As illustrated in the flowchart of FIG. 13, in step S10 relating to the remote operation of the present embodiment, in step S101a before the autonomous travel control of the subject vehicle V is started, the gesture determination unit 212 sets the first gesture determination area Ga0 at a preliminarily set position on the touch panel 211 regardless of the input position of the touch operation with respect to the touch panel 211. The input guide 212a may be displayed on the touch panel 211 so as to correspond to the first gesture determination area Ga0. When the gesture is detected from the first gesture determination area Ga0 in the next step S102a, the gesture determination unit 212 determines in the next step S103a whether the detected gesture is the command gesture G4 and whether the detected gesture is input at an input speed within a preliminarily set predetermined range.

When the detected gesture is not the command gesture G4, or when the input speed falls outside the predetermined range, the operation of the gesture determination unit 212 returns to step S102a, in which the gesture determination unit 212 detects the next gesture. On the contrary, when the detected gesture is the command gesture G4 and the input speed falls within the predetermined range, the process proceeds to step S104a, in which the command unit 214 generates the execution command signal and the communication unit 215 sends the execution command signal to the subject vehicle V. This allows the subject vehicle V to execute the autonomous travel control. In the next step S105a, when the detection of the gesture continues, the process proceeds to step S106a, in which the gesture determination unit 212 sets a new gesture determination area in accordance with the input position of the touch operation on the touch panel 211. After setting the new gesture determination area, the process returns to step S103a, from which the determination of the gesture is repeated.

When the subject vehicle V does not start the autonomous travel control at the time of starting the remote operation of the subject vehicle V, the operator U is likely to look at the remote operation device 21 in order to start the operation of the remote operation device 21. Accordingly, by displaying the input guide 212a at a preliminarily set position on the touch panel 211 to set the first gesture determination area Ga0, it is possible to suggest the operation necessary for the operator U and thus suppress the uncomfortable feeling given to the operator U. On the contrary, after the autonomous parking control of the subject vehicle V is started, the operator U is likely to look aside from the remote operation device 21 to monitor the subject vehicle V. It is thus highly likely that the touch operation deviates from the first gesture determination area Ga0; therefore, by setting a new gesture determination area in accordance with the input position of the touch operation, the autonomous travel control of the subject vehicle V can be continued.

Third Embodiment

The description will then be made for a third embodiment of the remote parking system to which the vehicle remote control method and vehicle remote control device of the present invention are applied. For the same configurations as those of the first embodiment, the same reference numerals as those of the first embodiment will be used, and detailed description thereof will be omitted.

In the second embodiment, the first gesture determination area Ga0 is set at a preliminarily set position on the touch panel 211 before the autonomous travel control of the subject vehicle V is started. Then, after the autonomous travel control of the subject vehicle V is started, a new gesture determination area is set in accordance with the input position of the touch operation. On the other hand, in the present embodiment, a new gesture determination area is set in accordance with the input position of the touch operation before the autonomous travel control of the subject vehicle V is started. Then, after the autonomous travel control of the subject vehicle V is started, the first gesture determination area Ga0 is set at a preliminarily set position on the touch panel 211. That is, in the present embodiment, the switching of the gesture determination area is reversed from that in the second embodiment between before and after the start of the autonomous travel control of the subject vehicle V.

Figure 14:
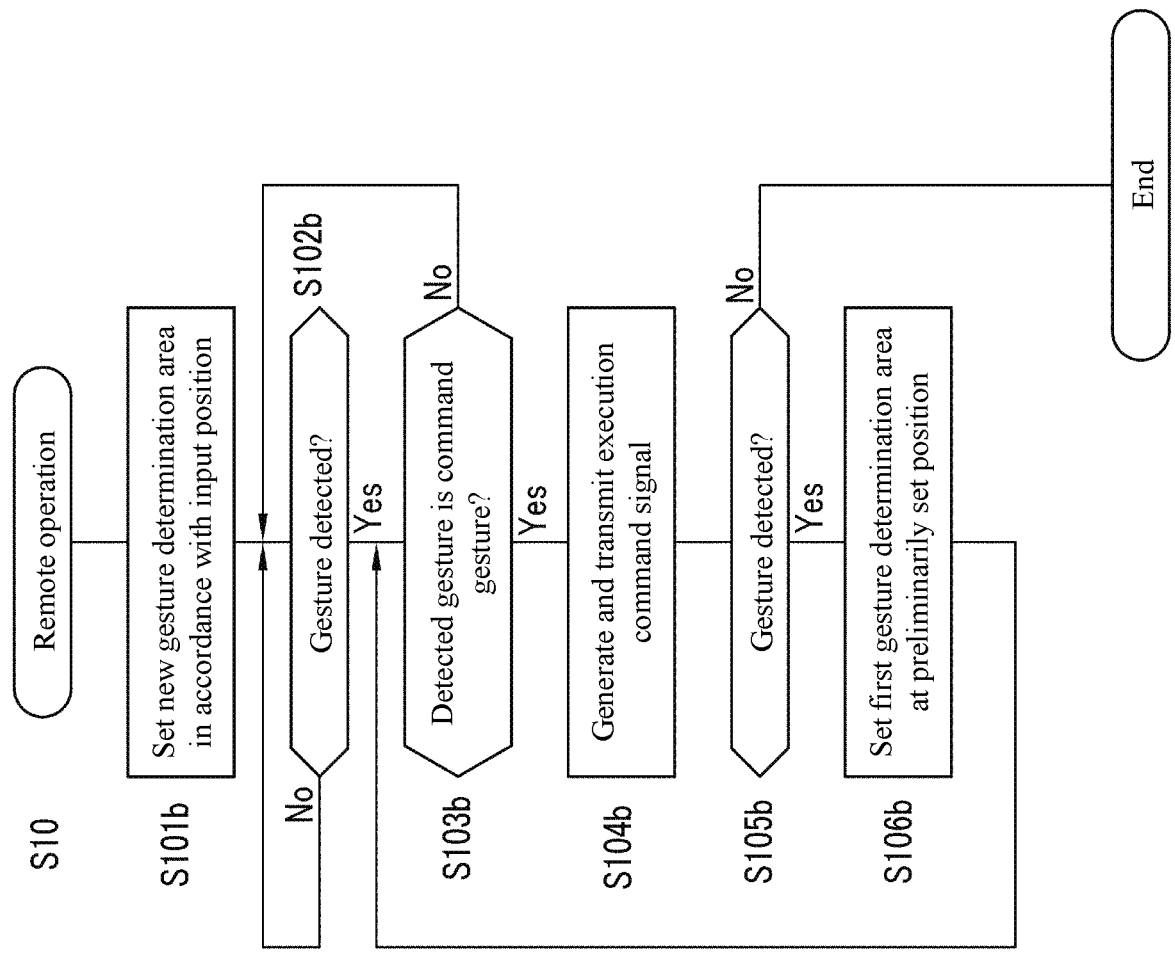
FIG. 14 is a flowchart illustrating a procedure of the remote operation of a third embodiment.

As illustrated in the flowchart of FIG. 14, in step S101b before the autonomous travel control of the subject vehicle V is started in step S10 relating to the remote operation of the present embodiment, the gesture determination unit 212 sets a new gesture determination area in accordance with the input position of the touch operation on the touch panel 211. When the gesture input to the touch panel 211 is detected in the next step S102b, the gesture determination unit 212 determines in the next step S103b whether the detected gesture is the command gesture G4 and whether the detected gesture is input at an input speed within a preliminarily set predetermined range.

When the detected gesture is not the command gesture G4, or when the input speed falls outside the predetermined range, the process returns to step S102b, in which the next gesture is detected. On the contrary, when the detected gesture is the command gesture G4 and the input speed falls within the predetermined range, the process proceeds to step S104b, in which the command unit 214 generates the execution command signal and the communication unit 215 sends the execution command signal to the subject vehicle V. This allows the subject vehicle V to execute the autonomous travel control. In the next step S105b, when the detection of the gesture continues, the process proceeds to step S106b. In step S106b, the gesture determination unit 212 sets the first gesture determination Ga0 at a preliminarily set position on the touch panel 211 regardless of the input position of the touch operation on the touch panel 211. The input guide 212a may be displayed on the touch panel 211 so as to correspond to the first gesture determination area Ga0. After setting the first gesture determination area Ga0, the process returns to step S103b, in which the determination of the gesture is repeated.

When the subject vehicle V does not start the autonomous travel control at the time of starting the remote operation of the subject vehicle V, the operator U may look at the subject vehicle V in order to confirm that the subject vehicle V starts the autonomous travel control. Accordingly, by setting a new gesture determination area in accordance with the input position of the touch operation, it is possible to easily start the autonomous travel control of the subject vehicle V. Moreover, after the autonomous parking control of the subject vehicle V is started, the operator U may look at the remote operation device 21 in order to accurately operate the remote operation device 21. Accordingly, by displaying the input guide 212a at a preliminarily set position and setting the first gesture determination area Ga0, the operator U can be prompted to accurately operate the remote operation device 21.

Fourth Embodiment

The description will then be made for a fourth embodiment of the remote parking system to which the vehicle remote control method and vehicle remote control device of the present invention are applied. For the same configurations as those of the first embodiment, the same reference numerals as those of the first embodiment will be used, and detailed description thereof will be omitted.

In the first to third embodiments, the gesture determination area is switched with a trigger, such as a change in the input position of the touch operation or whether the timing is before or after the start of the autonomous travel control of the subject vehicle V. On the other hand, in the present embodiment, in the case in which the autonomous travel control of the subject vehicle V is being executed, a determination is made as to whether or not the subject vehicle V is traveling straight ahead, and when the subject vehicle V is traveling straight ahead, a new gesture determination area is set in accordance with the input position to the touch panel 211, while when the vehicle is not traveling straight ahead, the first gesture determination area Ga0 is set at a preliminarily set position.

Figure 15:
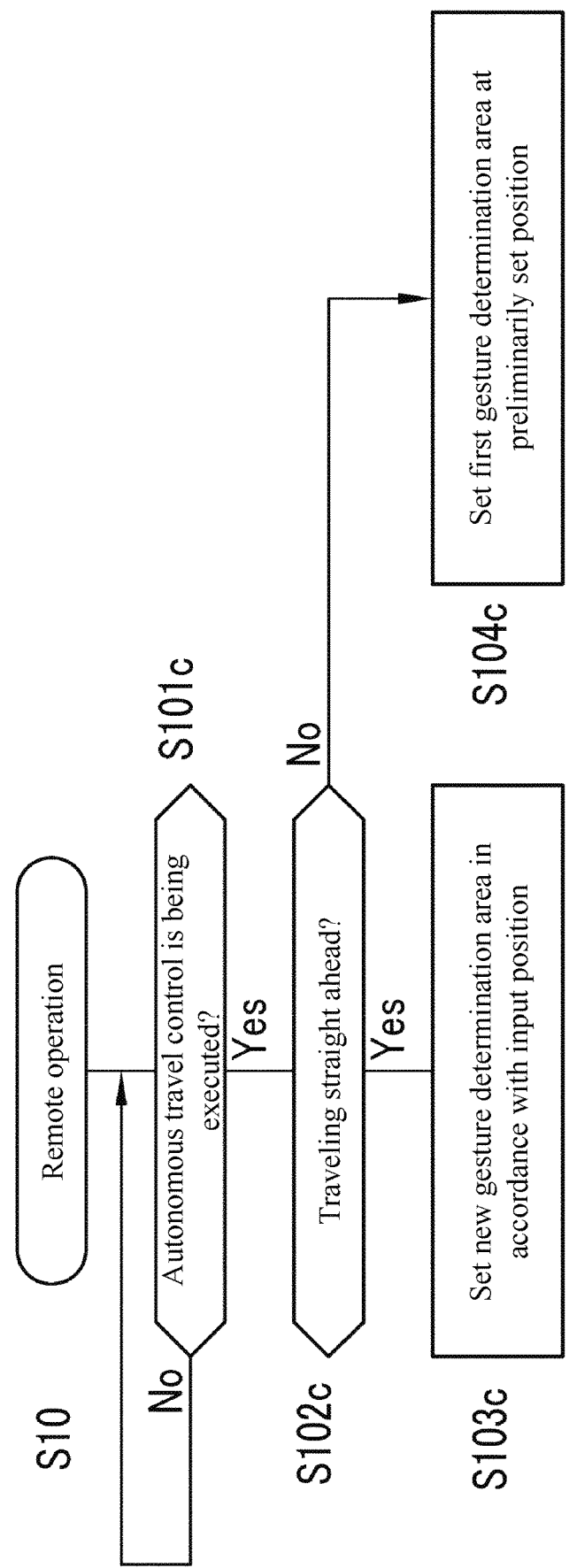
FIG. 15 is a flowchart illustrating a procedure of the remote operation of a fourth embodiment.

As illustrated in the flowchart of FIG. 15, in step S10 relating to the remote operation of the present embodiment, the gesture determination unit 212 determines in step S101c whether or not the subject vehicle V is executing the autonomous travel control. When the subject vehicle V is executing the autonomous travel control, the gesture determination unit 212 determines in step S102c whether or not the subject vehicle V is traveling straight ahead. When the subject vehicle V is traveling straight ahead, the operation of the gesture determination unit 212 proceeds to the next step S103c, in which the gesture determination unit 212 sets a new gesture determination area in accordance with the input position of the touch operation on the touch panel 211. When the subject vehicle V is not traveling straight ahead in step S102c, the process proceeds to the next step S104c, in which the gesture determination unit 212 sets the first gesture determination area Ga0 at a preliminarily set position on the touch panel 211 regardless of the input position of the touch operation on the touch panel 211. The input guide 212a may be displayed on the touch panel 211 so as to correspond to the first gesture determination area Ga0.

When the subject vehicle V travels straight ahead by the autonomous travel control, particularly when the subject vehicle V travels straight ahead in the direction away from the operator U, the operator U may look at the subject vehicle V so that the subject vehicle V does not collide with an obstacle or the like. Accordingly, by setting a new gesture determination area in accordance with the input position of the touch operation, it is possible to easily execute the autonomous travel control of the subject vehicle V. Moreover, when the subject vehicle V is making a turn or the like rather than traveling straight ahead, the autonomous travel control of the subject vehicle V may be performed relatively close to the operator U. In such a case, the operator U may look at the remote operation device 21 in order to accurately operate the remote operation device 21. Accordingly, by displaying the input guide 212a at a preliminarily set position and setting the first gesture determination area Ga0, the operator U can be prompted to accurately operate the remote operation device 21.

Fifth Embodiment

The description will then be made for a fifth embodiment of the remote parking system to which the vehicle remote control method and vehicle remote control device of the present invention are applied. For the same configurations as those of the first embodiment, the same reference numerals as those of the first embodiment will be used, and detailed description thereof will be omitted.

In the fourth embodiment, when the subject vehicle V is traveling straight ahead by the autonomous travel control, the gesture determination area is set in accordance with the input position on the touch panel 211, while when the vehicle V is not traveling straight ahead, the first gesture determination area Ga0 is set at a preliminarily set position. In the present embodiment, contrary to the fourth embodiment, when the subject vehicle V is traveling straight ahead, the first gesture determination area Ga0 is set at a preliminarily set position, while when the subject vehicle V is not traveling straight ahead, the gesture determination area is set in accordance with the input position on the touch panel 211.

As illustrated in the flowchart of FIG. 16, in step S10 relating to the remote operation of the present embodiment, the gesture determination unit 212 determines in step S101d whether or not the subject vehicle V is executing the autonomous travel control. When the subject vehicle V is executing the autonomous travel control, the gesture determination unit 212 determines in step S102d whether or not the subject vehicle V is traveling straight ahead. When the subject vehicle V is traveling straight ahead, the operation of the gesture determination unit 212 proceeds to the next step S103d, in which the gesture determination unit 212 sets the first gesture determination area Ga0 at a preliminarily set position on the touch panel 211 regardless of the input position of the touch operation on the touch panel 211. The input guide 212a may be displayed on the touch panel 211 so as to correspond to the first gesture determination area Ga0. On the other hand, when the subject vehicle V is not traveling straight ahead in step S102d, in the next step S104d, the gesture determination unit 212 sets a new gesture determination area in accordance with the input position of the touch operation on the touch panel 211.

When the subject vehicle V travels straight ahead by the autonomous travel control, it is highly likely that the operator U looks at the remote operation device 21 because the operator U starts the operation of the remote operation device 21 after preliminarily confirming the traveling direction of the subject vehicle V. Accordingly, by displaying the input guide 212a at a preliminarily set position on the touch panel 211 to set the first gesture determination area Ga0, it is possible to suggest the operation necessary for the operator U and thus suppress the uncomfortable feeling given to the operator U. On the contrary, when the subject vehicle V is making a turn or the like rather than traveling straight ahead, it is highly likely that the operator U looks at the subject vehicle V to confirm that no obstacles are present in the surroundings. Accordingly, by setting a new gesture determination area in accordance with the input position of the touch operation, it is possible to easily execute the autonomous travel control of the subject vehicle V.

In the above embodiments, examples have been described in which the remote operation device 21 is provided with the gesture determination unit 212 and the command unit 214, but as substitute for such a constitution, the subject vehicle V may be provided with the gesture determination unit 212 and the command unit 214. In this case, the remote operation device 21 may transmit the detected value of the touch panel 211 to the subject vehicle V, the gesture determination unit 212 of the subject vehicle V may determine whether or not the input gesture is the command gesture, and the command unit 214 of the subject vehicle V may output the execution command signal to the route following controller 16 and the target vehicle speed generator 17.

DESCRIPTION OF REFERENCE NUMERALS

1 Remote parking system
11 Target parking space setting device
12 Vehicle position detector
3 Object detector
14 Parking route generator
15 Object deceleration calculator
16 Route following controller
17 Target vehicle speed generator
18 Steering angle controller
19 Vehicle speed controller
20 Base unit
22 Extension unit
21 Remote operation device
211 Touch panel
212 Gesture determination unit
212a Input guide
213 Storage unit
214 Command unit
215 Communication unit
G1 to G7 Command gesture
Ip0 Center position
Ga0, Ga1, Ga2 Gesture determination area
V Subject vehicle
TPS Target parking space
R1, R2 Parking route
W Wall (obstacle)
H1, H2 House (obstacle)
WD Garden tree (obstacle)

The invention claimed is:

1. A vehicle remote control method comprising:
   detecting an input position at which a touch operation is performed by an operator on a touch panel of a remote operation device;
   making a gesture determination area variable in accordance with the input position, the gesture determination area being an area in which a gesture for remotely controlling a vehicle is received;
   detecting the gesture from the gesture determination area;
   determining whether or not the detected gesture is a command gesture that is preliminarily set; and
   when the gesture is the command gesture, controlling the vehicle to execute autonomous travel control, the vehicle having an autonomous travel control function, the method further comprising:
   setting a first gesture determination area at a preliminarily set position before the autonomous travel control is started; and
   setting a new gesture determination area in accordance with the input position after the autonomous travel control is started.

2. The vehicle remote control method according to claim 1, wherein a size of the gesture determination area with respect to the touch panel is variable.

3. The vehicle remote control method according to claim 2, wherein the size of the gesture determination area is variable between a minimum input size and a maximum input size that are preliminarily set.

4. The vehicle remote control method according to claim 1, comprising:
   when the autonomous travel control is executed, determining whether or not the vehicle is traveling straight ahead by the autonomous travel control;
   when the vehicle is traveling straight ahead, setting the gesture determination area in accordance with the input position; and
   when the vehicle is not traveling straight ahead, setting the gesture determination area at a preliminarily set position.

5. The vehicle remote control method according to claim 1, comprising:
   when the gesture becomes not detected, storing the gesture determination area set immediately before the gesture becomes not detected as a second gesture determination area; and
   when input of the gesture is restarted, determining whether or not the gesture is the command gesture from the second gesture determination area.

6. The vehicle remote control method according to claim 5, wherein cases in which the gesture becomes not detected include a case in which a finger of the operator is released from the touch panel, a case in which a determination is not made that the gesture is the command gesture, and a case in which the operator ends the input of the gesture in midcourse.

7. The vehicle remote control method according to claim 1, comprising:
   when input of the gesture is restarted after the gesture becomes not detected, determining whether or not the gesture is the command gesture from the first gesture determination area.

8. The vehicle remote control method according to claim 1, wherein when a lateral direction and a longitudinal direction of the touch panel are defined as an X axis and a Y axis, respectively, the command gesture is the touch operation in which coordinates of the input position by the touch operation of the operator vary continuously in at least one of the X axis and the Y axis.

9. The vehicle remote control method according to claim 8, wherein the command gesture is the touch operation of drawing a trajectory of a figure on the touch panel so that a starting end at which one input of the gesture is started and a terminating end at which the one input of the gesture is terminated overlap each other.

10. The vehicle remote control method according to claim 9, wherein the command gesture is the touch operation of drawing the trajectory of a circular-shaped figure on the touch panel.

11. The vehicle remote control method according to claim 10, wherein the gesture determination area is defined by center coordinates and a radius of the circular-shaped figure.

12. The vehicle remote control method according to claim 1, wherein when the gesture becomes not detected, the vehicle is controlled to stop the autonomous travel control.

13. The vehicle remote control method according to claim 1, wherein the autonomous travel control is parking control of parking the vehicle.

14. The vehicle remote control method according to claim 1, comprising:
   displaying an input guide indicating a shape of the gesture on the touch panel; and
   setting the gesture determination area at a position corresponding to the input guide.

15. A vehicle remote control device comprising:
   a remote operation device for a vehicle, the remote operation device including a touch panel configured to detect an input position of a touch operation performed by an operator;

a gesture determination unit configured to:
> make a gesture determination area variable in accordance with the input position, the gesture determination area being an area in which a gesture for remotely controlling the vehicle is received; and
> determine whether or not the gesture detected from the gesture determination area is a command gesture that is preliminarily set; and a command unit configured to, when the gesture is the command gesture, control the vehicle to execute autonomous travel control, the vehicle having an autonomous travel control function, wherein the gesture determination unit is further configured to:
> set a first gesture determination area at a preliminarily set position before the autonomous travel control is started; and
> set a new gesture determination area in accordance with the input position after the autonomous travel control is started.

16. A vehicle remote control method comprising:

detecting an input position at which a touch operation is performed by an operator on a touch panel of a remote operation device;

making a gesture determination area variable in accordance with the input position, the gesture determination area being an area in which a gesture for remotely controlling a vehicle is received;

detecting the gesture from the gesture determination area;

determining whether or not the detected gesture is a command gesture that is preliminarily set; and when the gesture is the command gesture, controlling the vehicle to execute autonomous travel control, the vehicle having an autonomous travel control function, the method further comprising:
> setting the gesture determination area variable in accordance with the input position before the autonomous travel control is started; and
> setting the gesture determination area at a preliminarily set position after the autonomous travel control is started.

17. The vehicle remote control method according to claim 16, wherein a size of the gesture determination area with respect to the touch panel is variable.

18. The vehicle remote control method according to claim 17, wherein the size of the gesture determination area is variable between a minimum input size and a maximum input size that are preliminarily set.

19. The vehicle remote control method according to claim 16, comprising:
> when the autonomous travel control is executed, determining whether or not the vehicle is traveling straight ahead by the autonomous travel control;
> when the vehicle is traveling straight ahead, setting the gesture determination area in accordance with the input position; and
> when the vehicle is not traveling straight ahead, setting the gesture determination area at a preliminarily set position.

20. The vehicle remote control method according to claim 16, wherein when a lateral direction and a longitudinal direction of the touch panel are defined as an X axis and a Y axis, respectively, the command gesture is the touch operation in which coordinates of the input position by the touch operation of the operator vary continuously in at least one of the X axis and the Y axis.

21. The vehicle remote control method according to claim 20, wherein the command gesture is the touch operation of drawing a trajectory of a figure on the touch panel so that a starting end at which one input of the gesture is started and a terminating end at which the one input of the gesture is terminated overlap each other.

22. The vehicle remote control method according to claim 21, wherein the command gesture is the touch operation of drawing the trajectory of a circular-shaped figure on the touch panel.

23. The vehicle remote control method according to claim 22, wherein the gesture determination area is defined by center coordinates and a radius of the circular-shaped figure.

24. The vehicle remote control method according to claim 16, wherein when the gesture becomes not detected, the vehicle is controlled to stop the autonomous travel control.

25. The vehicle remote control method according to claim 16, wherein the autonomous travel control is parking control of parking the vehicle.

26. The vehicle remote control method according to claim 16, comprising:
> displaying an input guide indicating a shape of the gesture on the touch panel; and
> setting the gesture determination area at a position corresponding to the input guide.

27. A vehicle remote control device comprising:

a remote operation device for a vehicle, the remote operation device including a touch panel configured to detect an input position of a touch operation performed by an operator;

a gesture determination unit configured to:
> make a gesture determination area variable in accordance with the input position, the gesture determination area being an area in which a gesture for remotely controlling the vehicle is received; and
> determine whether or not the gesture detected from the gesture determination area is a command gesture that is preliminarily set; and a command unit configured to, when the gesture is the command gesture, control the vehicle to execute autonomous travel control, the vehicle having an autonomous travel control function, wherein the gesture determination unit is further configured to:
> set the gesture determination area variable in accordance with the input position before the autonomous travel control is started; and
> set the gesture determination area at a preliminarily set position after the autonomous travel control is started.

* * * * *